US012802476B2

(12) United States Patent
Malviya et al.

(10) Patent No.: US 12,802,476 B2
(45) **Date of Patent: *Nov. 17, 2026**

(54) CONTINUAL TEXT RECOGNITION USING PROMPT-GUIDED KNOWLEDGE DISTILLATION

(71) Applicant: EXlSerVice Holdings, Inc., New York, NY (US)

(72) Inventors: Ankit Malviya, Ujjain (IN); Shubhanshu Kumar Singh, Gajraula (IN); Vishu Mittal, Pilkhuwa (IN); Anish Goswami, Pune (IN); Chaithanya Manda, Jersey City, NJ (US); Saurabh Khanna, Gurgaon (IN); Sarika Pal, Bangalore (IN)

(73) Assignee: ExlService Holdings, Inc., New York, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/766,599

(22) Filed: Jul. 8, 2024

(65) Prior Publication Data

US 2024/0362937 A1 Oct. 31, 2024

Related U.S. Application Data

(63) Continuation of application No. 18/389,641, filed on Dec. 19, 2023, now Pat. No. 12,033,408, which is a (Continued)

(51) Int. Cl.
*G06V 30/146* (2022.01)
*G06V 30/16* (2022.01)
(Continued)

(52) U.S. Cl.
CPC ............ *G06V 30/147* (2022.01); *G06V 30/16* (2022.01); *G06V 30/18* (2022.01); *G06V 30/19147* (2022.01)

(58) Field of Classification Search
CPC ...... G06V 30/147; G06V 30/16; G06V 30/18; G06V 30/19147; G06N 3/045; G06N 3/08; G06N 5/01; G06F 16/5846
See application file for complete search history.

(56) References Cited

U.S. PATENT DOCUMENTS 10,740,603 B2 8/2020 Davis
11,182,604 B1 11/2021 Methaniya
(Continued)

FOREIGN PATENT DOCUMENTS

CN 111340056 * 6/2020 ............ G06F 18/22
CN 111340056 A 6/2020
(Continued)

OTHER PUBLICATIONS

International Search Report and Written Opinion mailed Apr. 5, 2023 in International Patent Application No. PCT/US22/50160, 10 pages.

*Primary Examiner* — Amara Abdi
(74) *Attorney, Agent, or Firm* — Ashurst Perkins Coie US LLP

(57) ABSTRACT

A text recognition system causes a trained region encoder to determine a region of interest of an image file. The system modifies a first image associated with the first region of interest (e.g., parsed out from the first region) to generate a data augmentation entity that includes a modified image. Using a trained instance encoder, the system generates a first set of visual instances corresponding to the first region of interest image and a second set of visual instances corresponding to the data augmentation entity. The system generates the corresponding first and second sequences. By executing a self-supervised contrastive loss function on the first and second sequences, the system automatically updates a continual knowledge distillation model of the trained
(Continued)

region encoder. The system provides the first sequence to an instance decoder to generate output text in response to the prompt.

20 Claims, 10 Drawing Sheets

Related U.S. Application Data continuation-in-part of application No. 18/367,920, filed on Sep. 13, 2023, now Pat. No. 12,260,342, which is a continuation-in-part of application No. 17/988,684, filed on Nov. 16, 2022, now Pat. No. 11,842,286.

(60) Provisional application No. 63/280,062, filed on Nov. 16, 2021.

(51) Int. Cl.
*G06V 30/18* (2022.01)
*G06V 30/19* (2022.01)

(56) References Cited

U.S. PATENT DOCUMENTS

| | | | | |
|---|---|---|---|---|
| 11,842,286 | B2 | 12/2023 | Manda et al. | |
| 12,033,408 | B1 | 7/2024 | Malviya et al. | |
| 2014/0223284 | A1 | 8/2014 | Rankin, Jr. et al. | |
| 2018/0005134 | A1 | 1/2018 | Kish | |
| 2019/0213250 | A1* | 7/2019 | Murphy | G06F 16/353 |
| 2019/0251182 | A1 | 8/2019 | Ray | |
| 2019/0303412 | A1 | 10/2019 | Ray | |
| 2019/0340240 | A1 | 11/2019 | Duta | |
| 2020/0160050 | A1* | 5/2020 | Bhotika | G06V 30/414 |
| 2020/0348809 | A1 | 11/2020 | Drescher | |
| 2021/0004629 | A1 | 1/2021 | Sun | |
| 2021/0012179 | A1 | 1/2021 | Kalia | |
| 2021/0082062 | A1 | 3/2021 | Hurd | |
| 2021/0192126 | A1* | 6/2021 | Gehrmann | G06N 3/09 |
| 2021/0240976 | A1 | 8/2021 | Tiyyagura et al. | |
| 2021/0303939 | A1* | 9/2021 | Hu | G06F 40/30 |
| 2022/0027610 | A1 | 1/2022 | Desai | |
| 2022/0172849 | A1 | 6/2022 | Bacon | |
| 2022/0179906 | A1 | 6/2022 | Desai | |
| 2022/0180113 | A1* | 6/2022 | Patel | G06F 18/2148 |
| 2022/0222284 | A1 | 7/2022 | Sahoo et al. | |
| 2022/0277858 | A1* | 9/2022 | Zhao | G16H 50/20 |
| 2022/0318224 | A1 | 10/2022 | Thompson et al. | |
| 2023/0041553 | A1 | 2/2023 | Shinagawa | |
| 2023/0065915 | A1* | 3/2023 | Berestovsky | G06F 18/22 |
| 2023/0095089 | A1 | 3/2023 | Kaliyaperumal | |
| 2023/0121351 | A1* | 4/2023 | Becker | G06F 16/353<br>715/217 |
| 2023/0260309 | A1 | 8/2023 | Jamshidikhezeli | |
| 2023/0343126 | A1* | 10/2023 | Salacinski | G06V 30/1448 |
| 2024/0160953 | A1 | 5/2024 | Manda et al. | |
| 2025/0029413 | A1* | 1/2025 | Semenov | G06N 3/084 |

FOREIGN PATENT DOCUMENTS

| | | | | |
|---|---|---|---|---|
| CN | 111383328 | * | 7/2020 | G06N 3/045 |
| CN | 111383328 | A | 7/2020 | |
| CN | 113035362 | A | 6/2021 | |
| WO | 2021194659 | A1 | 9/2021 | |

* cited by examiner

190

| | |
|---|---|
| Query 192 | When was John given the tetanus vaccine? |
| Output 194 | October 12, 2008 |

FIG. 1C

CONTINUAL TEXT RECOGNITION USING PROMPT-GUIDED KNOWLEDGE DISTILLATION

PRIORITY CLAIM

This application is a continuation of U.S. application Ser. No. 18/389,641, filed Dec. 19, 2023, which is a continuation-in-part of U.S. patent application Ser. No. 18/367,920, filed on Sep. 13, 2023, which is a continuation-in-part of U.S. application Ser. No. 17/988,684 filed, Nov. 16, 2022 (now U.S. Pat. No. 11,842,286), which claims priority to U.S. Provisional Application No. 63/280,062, filed Nov. 16, 2021, which are incorporated herein by reference in their entireties for all purposes.

TECHNICAL FIELD

The systems, methods, and computer-readable media disclosed herein relate generally to text recognition platforms. Some aspects of the disclosure relate to text recognition using improved techniques, such as self-supervised, continual learning, prompt-guided knowledge distillation techniques.

BACKGROUND

Legacy data records can include non-standard items, such as hand-written text, which can be difficult to automatically decode. To compound this problem, when legacy data records are digitized (e.g., scanned), the resulting images may be skewed or otherwise distorted. Artificial intelligence/machine learning (AI/ML) can be used to identify textual items in images. However, because of variability of shapes, fonts, character connectors, and other attributes of non-standard textual items, such as individual characters and character sequences in hand-written text, AI/ML systems that rely on pre-existing methods can have limited accuracy and be difficult to train due to noisy data or other constraints associated with training data. Furthermore, the training corpora requirements for such systems, including input items and their corresponding labeled data, can be quite large. Further still, such systems may not be natively suited, without being trained in a supervised manner, to detect specific regions in input documents where text items can be found.

BRIEF DESCRIPTION OF THE DRAWINGS

FIG. 1C shows an example prompt, including a query and an associated output generated by the text recognition platform, in accordance with some implementations of the present technology.

Figure 1A:
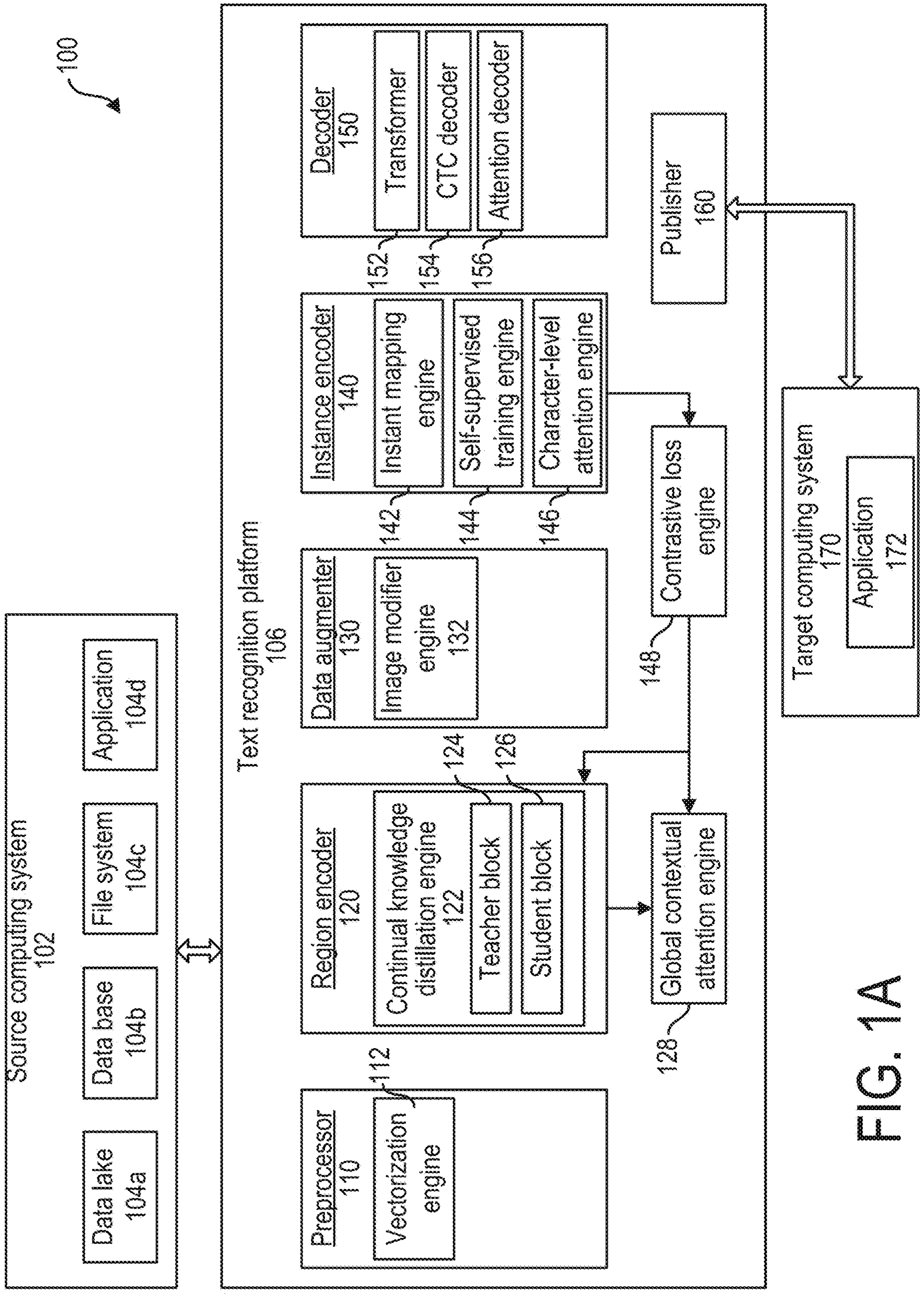
FIG. 1A shows an example computing environment that includes a text recognition platform in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Improving the system capacity to accurately and automatically interpret complex documents, such as documents that include mixed-type data and/or handwritten text, has been a long-standing technical problem. For instance, documents in medical records can include both images and hand-written data, such as schematics and/or diagrams manually annotated by healthcare providers. Such documents can be difficult to interpret because it may be difficult to, first, identify where particular types of information can be found (the region encoding/decoding problem), and, second, to decipher handwritten notes (the instance encoding/decoding problem). As an example, pain assessment instruments generally ask a patient or provider to annotate a particular region on a diagram that schematically represents the human body. Various pain assessment instruments (e.g., paper forms, electronic forms) may position such schematics (or parts thereof) in different portions of the form. The annotations can also look different according to different assessment instruments, and can include, for example, visual pain scales, numerical items, mark-up to emphasize a particular location, and so forth. Conventional computing systems cannot automatically determine the regions within a particular form where annotations can be found (the region encoding problem), nor can they accurately translate different types of annotations into a universal assessment scale (instance encoding problem).

The text recognition platform disclosed herein aims to solve these technical problems. To address the region encoding/decoding problem, the platform can pre-process information in image files to improve accuracy in response to prompts (e.g., user prompts) that seek to extract specific information from image files. By doing so, the platform can automatically determine one or more regions of interest (ROI) where responsive information is likely to be found. As a further technical advantage, the platform can detect, in input images, text of high complexity and/or text in mixed-type formats. For example, different parts of a document can include text of different handwriting or different fonts. The platform can flexibly obtain such mixed, heterogeneous, or varied text for text recognition-based tasks.

The platform can include a region encoder, which can be self-trained using, for example, attention-based knowledge distillation. By employing knowledge distillation techniques, the region encoder enables the AI/ML models of the platform to maintain knowledge of previous inputs without the need to store the input data itself. Accordingly, the region encoder enables long-term knowledge retention without the need to store sensitive data, while providing a way to continually learn using subsequently received inputs. The platform can also transform input data, including prompts and/or image regions, into vectors of a different data type (e.g., integers) in order to optimize the size and format of input features for self-training of the region encoder.

To address the instance encoding/decoding problem and increase the accuracy of instance detection (e.g., character detection), the platform can generate augmentations (e.g., modifications, transformations) of items extracted from the determined regions of interest. The augmentations can include rotations, translations, scaling, noise additions, color variations, linear contrasts, shear-, and/or skew-based augmentations. By generating images with such augmentations based on a particular input image (e.g., by detecting a region of interest from an input image file), the platform can improve the robustness of its text recognition technique(s) and capture characters and text in a variety of conditions. Furthermore, the platform can identify character sequences. The instance encoder and instance decoder models of the platform can be trained in a self-supervised manner. For instance, the platform can execute a minimization algorithm, associated with a particular contrastive loss metric, to train the instance encoder to improve its ability to distinguish between features that are relevant to text recognition and features that are not relevant (e.g., by comparing differences between instances associated with a particular previously generated augmentation and the source image).

Example Embodiments of a Text Recognition Platform

FIG. 1A shows an example computing environment 100 that includes a text recognition platform 106 in accordance with some implementations of the present technology. As shown, the computing environment 100 includes one or more of a source computing system 102 and one or more of a target computing system 170. These systems can be communicatively coupled to the text recognition platform 106 via a network. Each of the source computing system 102, target computing system 170, and text recognition platform 106 can each include various components, including one or more processors, memory modules, transceivers, network interfaces, databases, executable files (in binary form and/or in compiled form), libraries of executables, file structures, and so forth.

In some implementations, any of the source computing system 102, target computing system 170, and text recognition platform 106 can be distributed across more than one computing device. For example, a particular instance of text recognition platform 106 can be deployed as an executable environment available to a subscriber entity (e.g., an entity associated with a particular target computing system 170) in a cloud-based environment, such as, for example, in a virtual private cloud, via a virtual network, in DaaS (data-as-a-service) computing environments, SaaS (software-as-a-service) computing environments, PaaS (platform-as-a-service) computing environments, IaaS (infrastructure-as-a-service) computing environments, and/or the like. Accordingly, the executable environment can be deployed as a container, a pod of containers, cluster of containers, or a dedicated computing grid in a cloud-based environment, which provides varying levels of process and data isolation to meet various levels of data privacy and regulatory standards. At a minimum, the cloud-based implementation infrastructure described herein allows (at the container level) for isolating application programming interface (API) calls and data workflows, which secures and isolates data streams and data stores of a particular entity (e.g., an entity associated with a particular source computing system 102 or target computing system 170).

The text recognition platform 106 can acquire (obtain, receive, query, and so forth) input datasets from one or more source computing systems 102. In some implementations, the input data can be acquired via queries from various data sources associated with source computing systems 102, such as one or more of a data lake 104*a* and/or a database 104*b*. For example, a particular input dataset can originate from a data warehousing system, such as a data lake 104*a* and/or from a data warehousing or transactional database 104*b*. In some implementations, the input data can be received from a particular application 104*d*, in the form of an API message, at an API endpoint. The API endpoint can be a specific location within an API that accepts requests and sends back responses. In some implementations, the input data can be received from a particular file system 104*c* and/or from a particular application 104*d* (e.g., via an FTP process or another similar process). Obtained data can be stored within storage resources (e.g., an Amazon Simple Storage Service (S3) bucket or similar), which can be a cloud storage resource that receives and stores various files in an electronic data interchange ecosystem. The API endpoint and/or the storage resource can be an addressable location on a physical or virtual server of the text recognition platform 106. The addressable location can be identified by a URL, and IP address, a port number, or a combination thereof.

An example source computing system 102 can be or include any suitable computing system that provides data and/or communications, such as prompts from a user. For example, the source computing system 102 can provide images that include written text (e.g., handwritten, printed, or other representations of alphanumeric characters) and/or enable user queries relating to such images. As an illustrative example, the text recognition platform 106 can receive, from the source computing system 102, images of medical records, financial records (e.g., checks), insurance policy records, or other handwritten items for text recognition. More broadly, the text recognition platform 106 can receive, from the source computing system 102, a set of visual data (images, scanned images or data, screenshots, virtual whiteboard captures, and so forth). In some implementations, the text recognition platform 106 can receive data in data formats, such as a portable document format (PDF) or a text document format (e.g., an Open Document Format). The text recognition platform 106 can convert data within a non-image format to an image format to generate the visual data set. The visual data set can comprise information corresponding to one image file or a related collection of image files (e.g., medical records, a set of images associated with a particular healthcare provider). The visual data set can include handwritten items, hand-drawn items, stylus-written items, stylus-drawn items, photographs, diagrams, and so forth.

In some implementations, after receiving the images, the text recognition platform 106 causes (e.g., triggered based on receiving the images) a trained region encoder 120 to determine a region of an image file. The source computing system 102 then automatically identifies textual data as described below (e.g., using the various engines of the text recognition platform 106). In some implementations, the text recognition platform 106 causes another computing system, such as the systems described in U.S. patent application Ser. No. 17/988,684 and U.S. patent application Ser. No. 18/367,920, which are incorporated herein by reference, to detect and extract pages, regions, and/or form fields from the input images.

The target computing system 170 can include a computing system associated with an entity that receives the output data of text recognition platform 106, which can be the same or a different entity relative to the source computing system 102. For example, a particular source computing system 102, connected to a particular instance of the text recognition platform 106, can be operated by a particular medical institution (e.g., a care provider) and/or financial institution, and can include medical or financial data. The financial or healthcare institution can also be a consumer of the outputs of the particular instance of the text recognition platform 106 via a particular target computing system target computing system 170. In another example, another particular source computing system 102, connected to the particular instance of the text recognition platform 106, can include a computing system of a financial transaction processor or a medical data communication device, and the financial or medical institution can consume the outputs of the text recognition platform 106 via the particular target computing system 170, where the outputs are generated using aggregated data from multiple institutions (e.g., using transaction data or medical data for a customer or patient of the institution).

As shown, the text recognition platform 106 can include various engines, some of which can be omitted or combined according to various implementations. As used herein, the term "engine" can refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like. The engines can generate and/or receive various messages or data, such as images, model parameters (e.g., model weights), model training metrics and data structures (e.g., training data, or gradient information), information relating to model architectures (e.g., activation functions), and other suitable data. Whenever a particular message or dataset is referred to in the singular form, one of skill will appreciate that more than one message or dataset can be used to carry out the described operations. For example, a particular dataset, record, or item therein can be broken down into multiple messages or data structures. Furthermore, a particular system or module can generate or receive multiple items (e.g., datasets, records, and/or other items) in a particular message.

As shown according to an example implementation, the various engines of the text recognition platform 106 can include a preprocessor 110, a region encoder 120, a data augmenter 130, an instance encoder 140, a decoder 150, a publisher 160, a contrastive loss engine 148, and/or a global contextual attention engine 128.

Figure 1B:
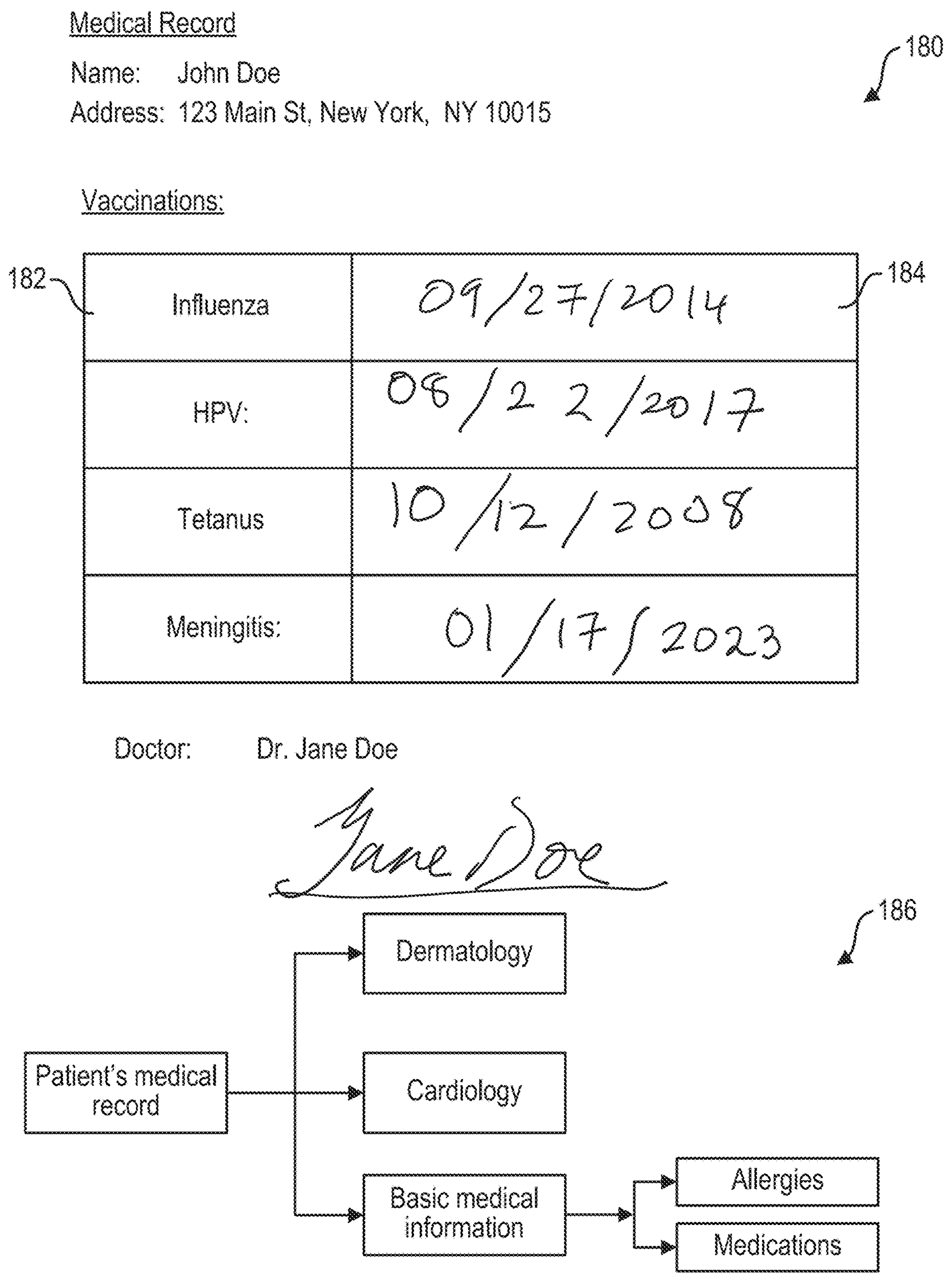
FIG. 1B shows an example input of the text recognition platform of FIG. 1A in accordance with some implementations of the present technology.

FIG. 1B shows an example input 180 of the text recognition platform 106 of FIG. 1A in accordance with some implementations of the present technology. A particular input can be included in an electronic message, for example, received at the text recognition platform 106 from the source computing system 102. The input can include images or other representations 186 of information, records, transactions (e.g., checks), or other suitable data. For example, the input can include medical records, such as biographical data (e.g., names, birthdates, addresses, or other information associated with patients), biometric data, vaccination records, provider records, or other information regarding a patient's care. As an illustrative example, the input 180 can include fields associated with vaccinations, such as a vaccination identifier 182 and an associated vaccination date 184. Any information within the input can be in a handwritten, printed, or another format (e.g., cursive, block lettering, signature).

In some implementations, the example input 180 can include records associated with financial transactions, such as checks, receipts, and/or other such data. For example, input 180 can include an image file or a scanned copy of a personal check, including a payer name, an address, a date, a check number, a payee, an amount (e.g., in a numerical format, as in an amount box, and/or in a spelled out format, as in an amount line), bank information associated with the personal check, a memo (e.g., as in a memo line), a signature (e.g., as in a signature field), a bank routing number, a checking account number, and/or other suitable information. Some or all information within the input 180 can be in a handwritten format, while some or all other information can be in a printed format (e.g., with one or more typographical fonts or typefaces). By receiving such information, the text recognition platform 106 can process such information to recognize text of heterogeneous or varying formats and forms. For example, different parts of the check can include text of different handwriting or different fonts (e.g., uppercase for the amount line, and/or mixed-case for the memo line). Text recognition platform 106 can flexibly obtain such mixed, heterogeneous, or varied text for text recognition-based tasks.

The text recognition platform 106 can obtain image files (e.g., inputs). In some implementations, an image file includes information of a format capable of representing images (e.g., representations of visual information). For example, an image file can include a file in a Joint Photographic Experts Group (JPEG), Portable Network Graphics (PNG), Graphics Interchange Format (GIF), Bitmap Image File (BMP) format, or any other suitable format. Image files include information stored as vector graphics, such as in a Scalable Vector Graphics (SVG) or Encapsulated PostScript (EPS) formats. The image file can be associated with other file formats, such as text documents (e.g., in an open document format (ODF) and/or a portable document format (PDF)). The image file can include information written in natural language, or information associated with alphanumeric characters, such as characters associated with magnetic ink character recognition (e.g., as relating to a bank statement, a check (e.g., a cashier's check, a personal check, or a certified check), or other financial instruments.

FIG. 1C shows an example prompt 190, including a query 192 and an associated output 194 generated by the text recognition platform in accordance with some implementations of the present technology. As an illustrative example, the query 192 includes a request for information relating to a person (e.g., John) and a date of vaccination for this person in relation to a particular infectious disease (e.g., tetanus). As such, the query 192 relates to a portion or a region of interest (ROI) of the input 180 (e.g., the medical) to a user submitting the query 192.

The text recognition platform 106 can receive or obtain prompts or queries (e.g., relating to one or more image files), such as those of FIG. 1C. For example, the text recognition platform 106 can receive or obtain prompts that seek to extract specific information from image files. Prompts or queries can include requests for information relating to regions of the image file. As an illustrative example, a prompt can request information relating to an associated vaccination date 184 associated with a vaccination associated with the vaccination identifier 182. In some implementations, the prompt includes a request for information relating to a check number associated with a check. Because medical records and financial instruments, such as checks, credit cards, or receipts, can include information in specified, pre-determined, or customary regions or portions of the respective documents, the prompt can request information associated with these relevant regions. As discussed below, the text recognition platform 106 can generate predictions for regions that include relevant information in response to the prompt using the region encoder 120 and associated engines.

The text recognition platform 106 enables preprocessing of the image file according to the prompt to respond to a user's query. For example, the text recognition platform 106 receives or obtains the prompt and the image file at the preprocessor 110. The preprocessor 110 can include one or more engines or modules, including a vectorization engine 112. The preprocessor 110 can execute operations and processes associated with preprocessing images and/or prompts. For example, the preprocessor 110 can convert image files into a file format compatible with the text recognition platform 106. In some implementations, preprocessor 110 can convert a document that includes multiple pages (e.g., multiple images or pages of a PDF) into various images, where each image corresponds to a page of the input document. As such, preprocessor 110 can create paginated documents for further processing and text recognition tasks.

In some implementations, the preprocessor 110 can include a vectorization engine 112. The vectorization engine 112 can convert image files and/or textual inputs into a vector format—e.g., into a vector of numbers. The use of a data transformation technique, such as vectorization, by the platform, enables a technical advantage of standardizing input data in a manner that allows for feature extraction, making it easier for the model to be trained. As an illustrative example, the vectorization engine 112 can convert an image file obtained from a user to a format that includes a data structure, such as one or more vectors of real numbers. In some implementations, vectorization engine 112 can convert text to a vectorized format. Further, the vectorization engine 112 can generate a prompt vector based on a prompt, using a natural language processing vectorization technique. As an illustrative example, the vectorization engine 112 can generate a bag of words, term frequency-inverse document frequency (TF-IDF), word2vec, global vectors (GloVe) or FastText representations of a prompt. For example, the prompt can include a string of alphanumeric characters (e.g., as in a string or character array data structure). Based on the string of alphanumeric characters, the preprocessor 110, through vectorization engine 112, can generate a vector representation of the prompt.

In some implementations, text recognition platform 106 includes a region encoder 120. Region encoder 120 can be configured to execute operations relating to determining regions of interest associated with a given document (e.g., an associated image file). The region encoder 120 can include one or more engines, such as a continual knowledge distillation engine 122, which can include a teacher block 124 and/or a student block 126. For example the region encoder 120 can obtain vectors associated with prompts (e.g., a vectorized prompt from preprocessor 110) and identity a region associated with the prompt for further processing (e.g., for further text recognition within the identified region). To illustrate, the region encoder 120 can receive an image file of a check (or a processed version thereof), as well as a prompt requesting an amount for an associated transaction (e.g., as written on the amount line of the check). The region encoder 120 can detect and generate an indication (e.g., in the form of coordinates) an associated region where a response to the prompt may be found. For example, the region encoder 120 can generate a representation of a region within the image file, such as a set of coordinates (in a pixel coordinate space) defining a rectangular region associated with the amount line of the check. In some implementations, region encoder 120 can generate a non-rectangular region, such as for identifying a field associated with a vaccination date (as in an image file associated with a medical record). By generating and predicting regions of a document or image that are likely associated with answers to a prompt, region encoder 120 enables text recognition and extraction from an image file in a flexible, targeted manner.

In some implementations, the region encoder 120 includes a continual knowledge distillation engine 122. The continual knowledge distillation engine 122 can include a model, algorithm, or technique associated with transferring knowledge from a first model to a second model, such as from a large model to a small model, or from an earlier version of a model to a later version of a model. For example, knowledge distillation enables capture of knowledge in a complex or large machine learning model. Additionally or alternatively, knowledge distillation enables capture of knowledge in an older model (e.g., a model trained on historical data) for use in an updated model (e.g., a model configured to adapt to new inputs). Accordingly, the continual knowledge distillation engine 122 can utilize self-supervised, supervised, or unsupervised training algorithms, or combinations thereof. By employing a knowledge distillation model, such as an attention-based knowledge distillation model, the region encoder 120 enables the model to maintain knowledge of previous training datareceived at the system, without the need to store the previous training data itself. As such, region encoder 120 enables long-term knowledge retention without storage of sensitive data, while providing a way to continually learn on subsequently received inputs.

In an example, the continual knowledge distillation engine 122 can include one or more models, including one or more teacher models (e.g., a model associated with a teacher block 124) and one or more student models (e.g., a model associated with a student block 126). The models can include deep neural network models (e.g., artificial neural networks (ANNs), convolutional neural networks (CNNs) or other model architectures).

The teacher block 124 can include a model that includes information, data, or parameters (e.g., model parameters, model weights, activation functions, or other suitable data) that embody knowledge of previous training data (e.g., image files and prompts) and associated outputs (e.g., regions of interest based on the prompts). For example, a model associated with the teacher block 124 (and/or the student block 126) can include an artificial neural network model trained over a pre-determined amount of time based on various input image files, and various prompts. For example, the model can include a region proposal network (RPN) and/or a bounding box Regression and Classification Network (RCN, as discussed further in relation to FIG. 3C). The teacher model, in some implementations, can have model parameters, attributes, or characteristics that are more computationally intensive than for a student model (e.g., as associated with the student block 126). As an illustrative example, the teacher model can include a greater number of model parameters, model weights, or layers than the student model. As such, by including a teacher model within the text recognition platform 106, the system disclosed herein enables storage and maintenance of knowledge for determining regions of images based on prompts based on historical training.

The student block 126 can include a model that includes information, data, or parameters (e.g., model parameters, model weights, and/or activation functions) that enable generation of outputs (e.g., regions of interest) based on inputs (e.g., image files and prompts). In some implementations, a student model associated with the student block 126 includes fewer model weights, model parameters, or computational requirements than for an analogous model within the teacher block 124. The student model associated with the student block 126 can include characteristics that enable adaptive training based on inputs (e.g., in a self-supervised manner), while receiving or obtaining knowledge from the corresponding teacher model (e.g., as associated with the teacher block 124), such as through an associated continual knowledge distillation mechanism. In some implementations, the student block and the teacher block can be or include the same model (e.g., in a self-distillation framework). For example, knowledge from deeper layers of a deep neural network can be used to train shallow layers of the same model in a self-distillation method. For example, knowledge from earlier training routines of the teacher model can be transferred to later training routines of the student model. Because such information does not include personal identifiable information or other sensitive data (as such information is not directly encoded within parameters), the continual knowledge distillation engine 122 enables knowledge retention to improve the accuracy of region-of-interest determination, while precluding the need to store sensitive information. Additionally or alternatively, the continual knowledge distillation engine 122 can utilize offline or online distillation methods (e.g., to train a student model based on more complex or larger teacher models). The continual knowledge distillation engine 122 can include distillation algorithms, such as adversarial distillation, multi-teacher distillation, cross-modal distillation, or other types of distillation, such as attention-based distillation.

In some implementations, continual knowledge distilled from the teacher model to the student model can include response-based knowledge, feature-based knowledge, and/or relation-based knowledge. For example, response-based knowledge can include information relating to a final output of the teacher model (e.g., and/or a final output of a text recognition algorithm associated with a determined ROI, or results of a corresponding contrastive loss algorithm). For example, for response-based continual knowledge distillation, information relating to an output ROI, or information relating to an output of recognized text, can be utilized to train the teacher model and/or the student model by determining a distillation loss associated with the corresponding output classes.

In some implementations, continual knowledge distilled from the teacher model to the student model can include feature-based knowledge, where a trained teacher model can capture knowledge of data within intermediate layers (e.g., associated model weights, other model parameters, or other suitable data). For example, the intermediate layers can discriminate specific features (e.g., features associated with different regions and different prompts) within the input data, which can be utilized to train a student model.

In some implementations, continual knowledge distilled from the teacher model to the student model can include relation-based knowledge, where knowledge can capture the relationship between feature maps, graphs, similarity matrices, feature embeddings, or probabilistic distributions based on these feature embeddings. As such, the methods and systems disclosed herein enable continual object detection and localization (e.g., localization of regions of interest within an image file in a prompt-guided manner) based on both prior knowledge, as well as through adaptation to subsequently received inputs, thereby enabling dynamic and accurate determination of regions of interest in response to user queries relating to image files or other documents, while preventing loss of knowledge gained from previous training routines.

In some implementations, the continual knowledge distillation engine 122 can include an attention-based algorithm. An attention-based continual knowledge distillation algorithm (e.g., an algorithm used in an attention-based continual knowledge distillation model) can include transferring knowledge (e.g., from a teacher model to a student model) on the basis of feature embeddings using attention (e.g., activation) maps. For example, the continual knowledge distillation engine 122 can generate activation maps (or associated representations), where such activation maps represent activations at various layers within the network. Attention can include a metric, weight, value, or algorithm (e.g., attention indicators) for determining attention of layers within an ANN to specific parts of data, based on weights assigned to corresponding parts of data. For example, an attention map can represent portions of the image file that are associated with corresponding words of the prompt; as such, the activation maps can be generated in a prompt-dependent manner, where the prompt can be utilized to generate attention maps. Additionally or alternatively, continual knowledge distillation engine 122 can include a self-attention algorithm to generate activation maps and associated activation values in a prompt-independent manner.

Based on generating activation maps, the continual knowledge distillation engine 122 can be trained to generate predictions of regions of interest within an image based on a query. For example, the continual knowledge distillation engine 122 can compare attention (e.g., activation) maps associated with the teacher model (e.g., as included in the teacher block 124) with attention maps associated with the student model (e.g., as included in the student block 126). By doing so, the continual knowledge distillation engine 122 can train the student model to localize more relevant areas of a given image file on the basis of knowledge transfer from a teacher model to a student model through a knowledge distillation process, in an attention-specific (and, therefore, a prompt-dependent) manner, as discussed further in relation to FIG. 3C. By doing so, continual knowledge distillation engine 122 can improve its efficiency and accuracy in generating predictions of regions of interest in response to user prompts for information relating to a document (or an associated image file).

In some implementations, the attention associated with continual knowledge distillation between the teacher block 124 and the student block 126 can include global attention. For example, the continual knowledge distillation engine 122 can include a global contextual attention engine 128, which can encode, in addition to prompt-specific attention, feature-feature and/or target-target relationships. For example, based on the student-teacher architecture of the continual knowledge distillation engine, continual knowledge distillation engine 122 can determine (e.g., learn) attention associated with features, and/or regions of interest (e.g., targets). By including the global contextual attention engine 128, text recognition platform 106 can avoid attention drifting by encoding global contextual information relating to relationships between features, targets, inputs, and outputs, thereby improving the representative ability of the region encoder 120 when a given prompt is applied to the model as an input.

In some implementations, the algorithms and models associated with the region encoder 120 (e.g., as associated with the continual knowledge distillation engine 122) can include supervised training techniques. For example, the region encoder 120 may receive labeled data associated with regions of training images to train the model to determine regions of relevance given associated training prompts. For example, a supervised algorithm for the continual knowledge distillation engine 122 can generate cross-entropy loss functions associated with teacher models of the teacher block 124 and the student models of the student block 126, and modify teacher and/or student model parameters on the basis of these cross-entropy loss functions, as described further in relation to FIG. 3B.

In some implementations, the text recognition platform 106 can include a data augmenter 130. A data augmenter 130 can include an algorithm, module, model, or process for augmenting data (e.g., modifying or adding variations to data, such as image files). As an illustrative example, the data augmenter 130 can include an image modifier engine 132 that is capable of modifying images (or portions thereof). As an illustrative example, the data augmenter 130, through the image modifier engine 132, can generate transformations of images corresponding to regions of interest within an input image file. The image modifier engine 132 can generate images that include rotations, translations, scaling, noise additions, color variations, linear contrasts, shear, or skew as compared to an input image. By generating modifications of the ROI, image modifier engine 132 can improve the quality and robustness of predictions of text recognition tasks on the basis of input images, as well as determine relevant features that are important to or associated with the recognized alphanumeric characters, while enabling the text recognition platform 106 to discern (e.g., learn) a variety of features (including various augmentations as described above).

For example, a rotation can include a rotation of the image (or a portion of the image associated with a ROI) about an axis perpendicular to the image plane. A translation can include a movement or mirroring of the image, such as about a pre-determined plane perpendicular to the image plane. Scaling can include a change in the size of the portion of the image and the features or data associated with the portion of the image. Noise additions can include the addition of noise (e.g., Gaussian or Poisson shot noise, salt-and-pepper noise, quantization noise, periodic noise, or other types of synthetic noise). Color variations can include variations in color, hue, or brightness associated with elements of the image. Linear contrast can include a linear contrast stretch algorithm (e.g., where the lower and upper bounds of a histogram associated with brightness values are linearly transformed to stretch to the full range of brightness associated with the text recognition platform 106). Image shearing or skewing can include a geometric augmentation that varies the form of an image along an axis (e.g., an axis in the plane of the image) to generate a different perception angle. By generating images with such transformations based on an input image (e.g., a region of interest from an input image file), the continual knowledge distillation engine 122 can improve the robustness of the text recognition platform 106 to capture characters and text in a variety of conditions, thereby enabling self-supervised learning of the text recognition platform.

As a result of the above transformations, the platform can generate data augmentation entities, which can be transformed images generated based on images parsed from or otherwise associated with a particular ROI.

The text recognition platform 106 can provide images, such as the ROI and associated data augmentation entities, as well as the associated prompt, to an instance encoder 140. The instance encoder 140 can include an instance mapping engine 142, a self-supervised training engine 144, and/or a character-level attention engine 146. The instance encoder can generate instances from regions of text using the instance mapping engine 142. An instance can include an entity associated with a classification of features associated with the text. For example, an instance can include a feature that corresponds to an alphanumeric character of the input text. The instance can be projected in a dimensional space associated with features of the region. For example, an instance can be a representation of a particular character in a vector space associated with an instance encoder model.

The instance mapping engine 142 can include a mapping of portions or features of images to an instance, where the instance encodes classification information associated with the portions or features. As an illustrative example, the instance mapping engine 142 can generate vector encodings of portions of regions of a medical record, where each vector encoding (e.g., an instance) can include a representation of a feature of a part of the medical record. For example, the instance can include a numerical array that encodes a character, line, corner, word, or another visual feature of the medical record (e.g., associated with a handwritten date associated with a patient's vaccination) in a manner that enables classification and/or comparison of these features with other features. The instance mapping engine 142 can include an encoder of a transformer encoder-decoder model. For example, the instance mapping engine 142 (e.g., an encoder) maps an input image to a set of continuous representations (e.g., in an encoding space). In some implementations, the instance mapping engine 142 can generate instances using this mapping, the mapping algorithm includes attention (e.g., multi-head attention). In some implementations, instance mapping engine 142 includes a sublayer with a fully connected feed-forward network, and can include positional encoding.

In some implementations, the instance mapping engine 142 can include a self-supervised training engine 144. The self-supervised training engine 144 enables training of the instance mapping engine 142 utilizing self-supervised learning. For example, through a contrastive learning algorithm (e.g., as discussed in relation to FIG. 3D), self-supervised training engine 144 enables training based on gradient recursion (or other methods, such as cross-domain translation or style-agnostic retrieval). For example, gradient recursion can improve domain invariant feature alignment for the instance mapping engine 142. For example, the self-supervised training engine 144 enables instance mapping engine 142 to continually learn while mitigating the forgetting of previously learned knowledge through a continual learning algorithm, such as through a recursive gradient optimization algorithm. For example, the recursive gradient optimization algorithm (e.g., gradient recursion) enables modifying model parameters associated with the self-supervised training engine 144 in a direction in the parameter space where there is agreement between different modalities, in order to train based on a domain invariant representation of the instances. For example, modalities can include text of different formats, fonts, or typefaces, such as handwritten and/or printed fonts. As such, the self-supervised gradient recursion algorithm enables alignment of features (e.g., instances associated with characters) in a manner that enables learning and application to a variety of possible input texts.

In some implementations, the instance encoder 140 includes a character-level attention engine 146. For example, the character-level attention engine 146 enables attention that is directed towards alphanumeric character detection. As an illustrative example, character-level attention engine 146 can utilize self-attention to enhance recognition of features associated with common alphanumeric characters (e.g., letters, numbers, magnetic ink character recognition characters, or other forms, such as signatures). For example, the character-level attention engine 146 can use spatial self-attention to generate instances that are associated with character-based spatial regions of a given image. By doing so, the character-level attention engine 146 can improve the resilience of text recognition platform 106 to different modalities (e.g., different forms) of text within a given ROI.

The instance encoder 140 can be trained using a contrastive loss (or other techniques such as triplet loss) algorithm, such as through a contrastive loss engine 148. For example, the contrastive loss algorithm can be self-supervised. For example, the instance encoder 140 can generate sequences based on the instances (e.g., by recognizing an order associated with characters that are related to the instances, such as by recognizing the order of the characters in the text of a particular ROI). By generating sequences, instance encoder 140 can generate output, such as through the decoder 150, or can further train the encoder using the contrastive loss engine 148, as discussed further in relation to FIG. 3D. The generated output can include alphanumeric characters, special characters, visual cues, schematics, annotations, and so forth.

In some implementations, the text recognition platform 106 includes a decoder 150. In various implementations, the decoder 150 can include a transformer 152, a connectionist temporal classification (CTC) decoder 154, and/or an attention decoder 156. For example, the decoder 150 can include multiple blocks that receive features (e.g., instances or the associated sequences) from the instance encoder 140, and can generate outputs (e.g., recognized text) based on these inputs, as in a transformer encoder-decoder system. As an illustrative example, the decoder 150 can generate a representation of text (e.g., a text string or a string of characters) associated with the ROI associated with the prompt. For example, the decoder 150 can generate a string associated with an amount of a check based on reading handwriting on the "amount" line of a check. Additionally or alternatively, the decoder 150 can generate a string associated with a vaccination date for a particular vaccine associated with an associated user query, based on an image of a page of a medical record obtained at the text recognition platform 106.

A CTC decoder 154 can include an architecture with a neural network output and associated scoring function (e.g., for training recurrent neural networks associated with sequences). For example, the CTC decoder 154 can receive input sequences and output labels associated with the input sequences, including blank outputs. For example, the CTC decoder 154 can generate a continuous output (e.g., a softmax) that is fitted through training to model a label probability. CTC scores associated with such probabilities can be used with a back-propagation algorithm to update neural network weights associated with the encoder-decoder system. In some implementations, the decoder can include attention, such as in the case of an attention decoder 156. For example, the attention can be associated with the character-level attention engine 146 and/or the global contextual attention engine 128.

In some implementations, the text recognition platform 106 can include a publisher 160, where the publisher 160 is configured to convert, transform, or transmit data to a target computing system 170. For example, the publisher 160 can generate a natural language output that includes an output of the decoder 150. In some instances, the publisher 160 can be structured as a chat bot that generates a chat message in response to the query posed by the user within the prompt. For example, the publisher 160 can generate a sentence that includes the recognized text on a chatbot interface for display on a user interface for the user. For example, this user interface can be associated with an application 172 of the target computing system 170.

One of skill will appreciate that the text recognition platform 106, through the features described herein, enables text recognition in an accurate, efficient manner using global, context-aware, prompt-aware region-of-interest determination and subsequent text recognition through a continual self-supervised training engine.

Figure 2:
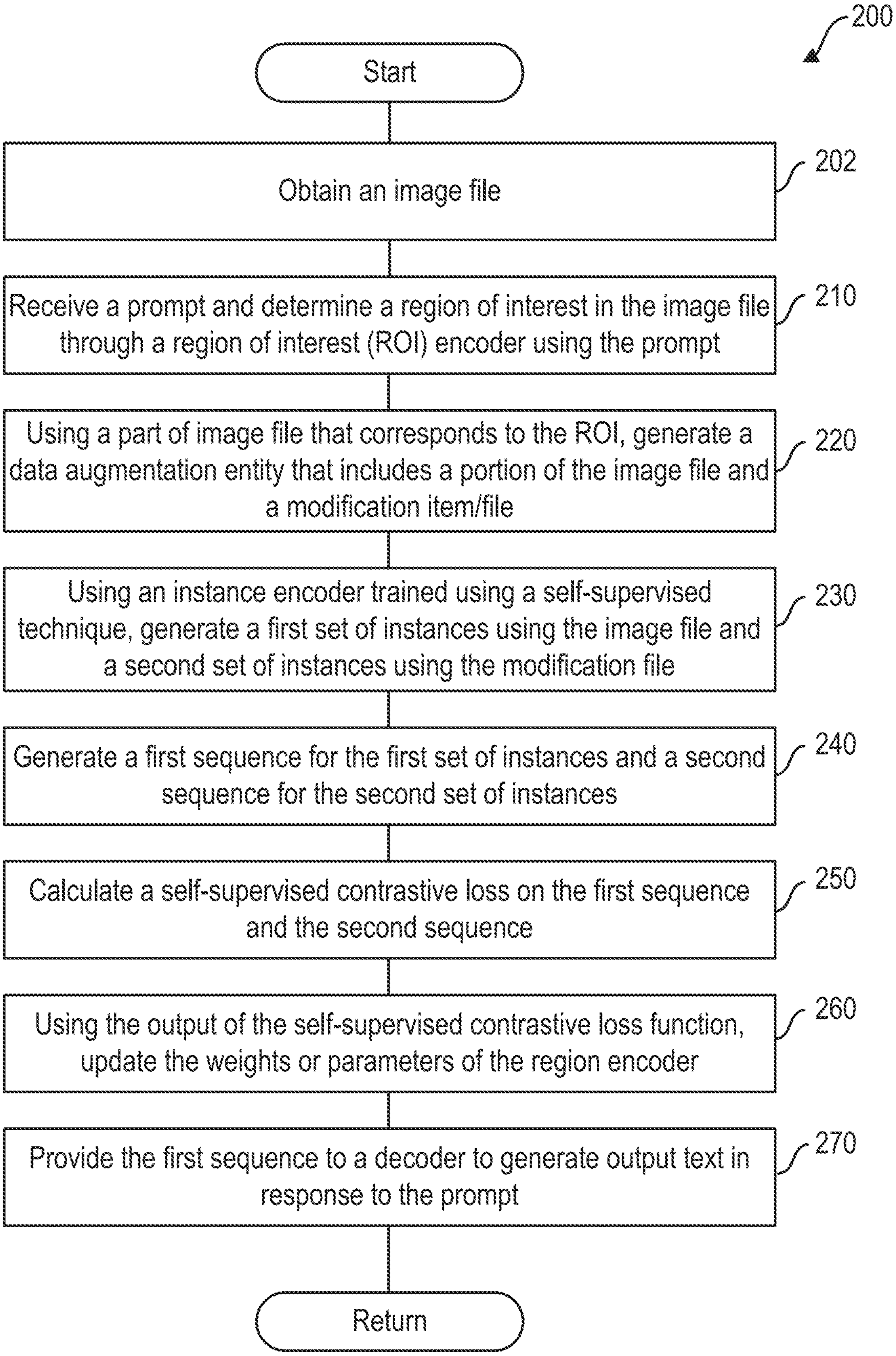
FIG. 2 is a flowchart depicting an example method of operation of the text recognition platform of FIG. 1A, in accordance with some implementations of the present technology

FIG. 2 is a flowchart 200 depicting an example method of operation of the text recognition platform of FIG. 1A, in accordance with some implementations of the present technology.

At operation 202, the text recognition platform 106 can obtain an image file. For example, the text recognition platform 106 can obtain, at the preprocessor 110, an image file comprising a visual representation of alphanumeric characters. As an illustrative example, the text recognition platform 106 can obtain an image or a file that includes medical records, such as a vaccination record, thereby enabling the text recognition platform 106 to respond to queries associated with the vaccination record.

At operation 210, the text recognition platform 106 can receive a prompt and determine a region of interest in the image file through a region of interest encoder using the prompt. In some implementations, the text recognition platform 106 receives a prompt and determine an indication of a ROI in the image file (e.g., through the trained region encoder 120). For example, using the prompt and the image file, the text recognition platform 106 can cause (e.g., as triggered by receiving the prompt or image file) the region encoder 120 to determine a first region of the image file. The region encoder can include an attention-based continual knowledge distillation model. As an illustrative example, the text recognition platform 106 can receive a prompt that includes a query regarding the vaccination record (e.g., a query for a vaccination date of a particular vaccination). As such, the text recognition platform 106, through region encoder 120, can determine a region associated with the image file that is likely to include information in response to the prompt. Thus, the text recognition platform 106 enables localization, within an input image or document, of information relevant to a given prompt for responses to associated queries.

In some implementations, the text recognition platform 106 can self-train the region encoder 120 utilizing a continual knowledge distillation engine 122. For example, the text recognition platform 106 can provide a representation of the prompt and the image file to a first feature extractor to generate a first feature set associated with a teacher model. The text recognition platform 106 can provide the representation of the prompt and the image file to a second feature extractor to generate a second feature set associated with a student model. Based on providing the first feature set and the prompt to the teacher model, the text recognition platform 106, through the region encoder 120, can generate a set of region proposals. Based on providing the second feature set, the prompt, and the set of region proposals to the student model, the region encoder 120 can perform adaptive knowledge distillation between the first feature set and the second feature set. Furthermore, the continual knowledge distillation engine 122 can update weights of the student model based on the cross-entropy loss metric to train the region encoder. Accordingly, the continual knowledge distillation engine 122 can update the region encoder 120 based on a knowledge distillation framework, thereby improving the ability of the text recognition platform 106 to retain information relating to previous training routines. As such, text recognition platform 106 improves the accuracy and applicability of the associated text recognition techniques to a variety of applications and inputs, while adaptively and continually learning further.

In some implementations, the text recognition platform 106 can generate an indication of the region using a global contextual attention engine 128. For example, the text recognition platform 106 can generate a prompt vector that represents the prompt in a vector format. The region encoder 120 can provide the prompt vector to a global contextual attention engine 128 to generate attention indicators associated with elements of the prompt vector. The region encoder 120 can generate the first region based on the attention indicators and the prompt vector. Accordingly, the text recognition platform 106 can utilize global contextual knowledge (e.g., through tracking of feature-feature, feature-target, and target-target relationships) in order to improve the quality of predictions of regions-of-interest, in a prompt-aware manner (e.g., through associated attention indicators, such as attention weights associated with a prompt vector. For example in an invoice, the specific region where an invoice number or customer name may be present may follow consistent patterns, appearing in similar regions across various sample invoices. Through the use of the global contextual attention engine 128, the region encoder can determine regions of greater attention within an image that are likely associated with a specific prompt based on these consistent patterns, thereby improving predictions of regions of interest in response to prompts.).

In some implementations, the text recognition platform 106 can update the region encoder 120 using the continual knowledge distillation engine 122. For example, based on providing the first image and the output text to the global contextual attention engine, the text recognition platform 106 can update the global contextual attention engine to generate updated regions based on input prompts. As an illustrative example, the text recognition platform 106 enables the improvements to predictions of regions of interest associated with prompts based on the global contextual attention engine 128.

At operations 220, the text recognition platform 106 can generate a data augmentation entity based on a part of the image file that corresponds to the ROI (e.g., through the data augmenter 130). For example, based on modifying a first image associated with the first region, data augmenter 130 can generate a data augmentation entity, where the data augmentation entity is an image file that includes an associated modification of the first image. Accordingly, the text recognition platform 106 enables generation of variations of input data that preserve the salient features of a given region of text, while improving the resilience of the model to diverse inputs. For example, the text recognition platform 106, through the data augmenter 130, can perform an operation on an image, where the operation includes at least one of a rotation, a translation, a scaling, a noise addition, a color variation, a linear contrast operation, a shear operation, or a skew operation. By doing so, the data augmenter 130 enables self-supervised learning using pre-processing, improving the efficiency of the text recognition platform 106.

At operations 230, the instance encoder 140 can generate instances using the image file and a second set of instances associated with the data augmentation entity (e.g., associated with a modification file). For example, using an instance encoder, the text recognition platform 106 can generate a first set of instances corresponding to the first image and a second set of instances corresponding to the data augmentation entity, where the instance encoder is trained using self-supervised gradient recursion. As an illustrative example, the instance encoder 140 can generate instances that encode possible salient features within a given ROI, for further processing, in order to generate character-level information relating to text within the ROI. For example, the instance encoder 140 can project features within a given ROI into an encoding space (e.g., with a lower dimensionality), to improve processing and subsequent interpretation of the text within the region.

In some implementations, the text recognition platform 106 can update the instance encoder 140 through gradient recursion (e.g., using the self-supervised training engine 144). Gradient recursion enables the text recognition platform 106 to align domain-invariant features (e.g., for domain invariant feature alignment). For example, using gradient recursion on the first set of instances and the second set of instances of the instance encoder, the self-supervised training engine 144 can be trained to determine (e.g., learn) the domain invariant feature alignment by updating model parameters for the instance encoder. Using the updated model parameters, the self-supervised training engine 144 can train the instance encoder to generate sets of instances. For example, the self-supervised training engine 144 can modify model parameters, such as model weights, activation functions, biases, or other hyperparameters associated with the instance encoder in order to improve identification of discriminative features associated with different characters or instances. For example, the self-supervised training engine 144 can modify a neural network associated with the instance encoder 140 to improve contrasts between distinct characters, symbols, or words on a medical record, while reducing differences between features (e.g., characters, letters or words) that are determined to be orthographically or lexically identical. For example, the self-supervised training engine 144 can execute an optimization routine characterized by a reduction in the self-supervised contrastive loss metric. As an illustrative example, the instance encoder 140 can improve the accuracy of instance generation by improving the similarity of character-related features (e.g., features associated with alphanumeric characters) through a gradient recursion algorithm.

In some implementations, the text recognition platform 106 can utilize spatial self-attention to generate the instances through instance encoder 140. For example, the text recognition platform 106 can provide the first image to a spatial self-attention engine, where the spatial self-attention engine includes a character-specific attention function. Based on providing the first image to the spatial self-attention engine, the instance encoder 140 can generate the first set of instances, where instances of the first set of instances correspond to characters of the visual representation of alphanumeric characters. Accordingly, the instance encoder 140 can leverage character-level spatial information to improve the ability of the instance encoder 140 to generate instances that are relevant to character recognition, thereby improving the resilience of text recognition platform 106 to differences in text modalities associated with input images (e.g., to improve handling of handwritten and printed text).

At operation 240 (e.g., in accordance with the components of the present disclosure), the text recognition platform 106 (e.g., through the instance encoder 140) can generate a first sequence for the first set of instances and a second sequence for the second set of instances. As an illustrative example, the instance encoder 140 can generate a sequence of instances, where each instance is in an ordering indicator associated with the text. For example, each instance can correspond to a character of the text within the ROI, where the instances are in order (e.g., a sequence). As such, instance encoder 140 can improve text recognition predictions based on patterns and relationships encoded in sequences of instances, thereby leveraging the spatial arrangement of characters in text recognition.

At operations 250, the self-supervised training engine 144 can calculate the self-supervised contrastive loss on the first sequence and the second sequence. The self-supervised training engine 144 can execute a contrastive loss function (e.g., a self-supervised algorithm) on the first sequence and the second sequence (e.g., through the self-supervised training engine 144). For example, the self-supervised contrastive loss engine 148 can execute a self-supervised contrastive loss function on the first sequence and the second sequence. As an illustrative example, the instance encoder 140 can execute this self-supervised contrastive loss on the sequences associated with the image to train itself to encode instances in a resilient manner.

At operations 260, the text recognition platform 106 can update weights or parameters of the region encoder using the output of the self-supervised contrastive loss function. For example, the global contextual attention engine 128 can update the attention-based continual knowledge distillation model of the region encoder 120. As an illustrative example, by comparing the generated sequences associated with the first, unmodified image, and the second, augmented image, the self-supervised contrastive loss engine 148 enables training of the instance encoder 140 to link (e.g., attract) the positive features (or common features in both images) and de-emphasize (e.g., push away) the negative features (or uncommon features in both images) further apart As such, self-supervised contrastive loss engine 148 can dynamically update the weights of the instance encoder 140 and improve the text recognition platform 106 in a self-supervised manner, such as through self-supervised training engine 144.

At operations 270, the decoder 150 can generate output text in response to the prompt. For example, the text recognition platform 106 can provide the first sequence to a decoder 150 to generate, for display on a graphical user interface, output text in response to the prompt. In some implementations, the decoder can include a transformer model, an attention decoder, or a CTC model. As an illustrative example, the text recognition platform 106 can generate output text based on recognizing text within the identified ROI. By doing so, the text recognition platform 106 can present results to the user on the basis of a query within the received prompt. For example, the text recognition platform 106 can generate a result for display on a user interface (e.g., associated with the application 172 on the target computing system 170), where the result specifies a vaccination date associated with a vaccination from the prompt, where the vaccination date is associated with a region within the provided medical records. As such, text recognition platform 106 enables generation of results to a user on the basis of a prompt, in a prompt-specific, dynamic manner that leverages previous experience associated with training routines, without requiring supervision or labelling of received inputs.

Figure 3A:
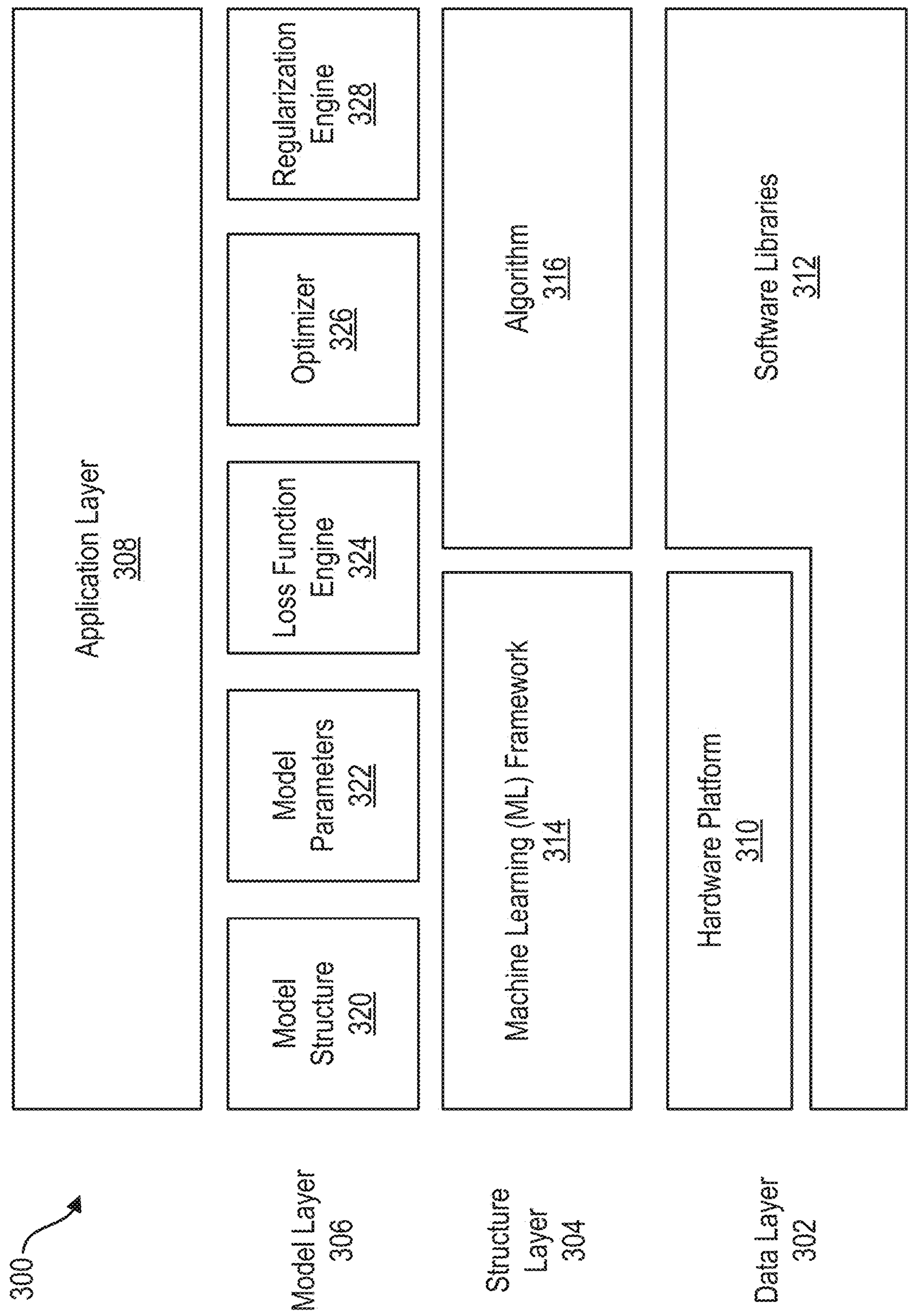
FIG. 3A illustrates a layered architecture of an artificial intelligence (AI) system that can implement the machine learning models of the text recognition platform of FIG. 1A, in accordance with some implementations of the present technology.

FIG. 3A illustrates a layered architecture of an artificial intelligence (AI) system that can implement the machine learning models of the text recognition platform 106 of FIG. 1A, in accordance with some implementations of the present technology. For example, the preprocessor 110, region encoder 120, data augmenter 130, instance encoder 140, and/or decoder 150 can include some or all elements described in relation to FIG. 3A.

As shown according to FIG. 3A, the AI system 300 can include a set of layers, which conceptually organize elements within an example network topology for the AI system's architecture to implement a particular AI model. Generally, an AI model is a computer-executable program implemented by the AI system 300 that analyzes data to make predictions. In the AI model, information can pass through each layer of the AI system 300 to generate outputs for the AI model. The layers can include a data layer 302, a structure layer 304, a model layer 306, and an application layer 308. The algorithm 316 of the structure layer 304 and the model structure 320 and model parameters 322 of the model layer 306 together form an example AI model. The optimizer 326, loss function engine 324, and regularization engine 328 work to refine and optimize the AI model, and the data layer 302 provides resources and support for application of the AI model by the application layer 308.

The data layer 302 acts as the foundation of the AI system 300 by preparing data for the AI model. As shown, the data layer 302 can include two sub-layers: a hardware platform 310 and one or more software libraries 312. The hardware platform 310 can be designed to perform operations for the AI model and can include computing resources for storage, memory, logic and networking, such as the resources described in relation to FIGS. 4 and 5. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 310 can include Infrastructure as a Service (IaaS) resources, which are computing resources (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The software libraries 312 can be thought of as suites of data and programming code, including executables, used to control and optimize the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include Intel Math Kernel Library, Nvidia cuDNN, Eigen, and Open BLAS. In some implementations, a software library 312 can include executables to optimize performance of the preprocessor 110, region encoder 120, data augmenter 130, instance encoder 140, and/or decoder 150.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Scikit-Fuzzy, Keras, Cafffe, LightGBM, Random Forest, Fuzzy Logic Toolbox, and Amazon Web Services.

The algorithm 316 can be an organized set of computer-executable operations used to generate output data from a set of input data and can be described using pseudocode. The algorithm 316 can include program code that allows the computing resources to learn from new input data and create new/modified outputs based on what was learned. More specifically, the algorithm 316 can include computer-executable code to enable the operations of the preprocessor 110, region encoder 120, data augmenter 130, instance encoder 140, and/or decoder 150 as described herein.

The algorithm 316 can build the AI model through being trained while running computing resources of the hardware platform 310. The training allows the algorithm 316 to make predictions or decisions without being explicitly programmed to do so. As described, the algorithm 316 can be trained using unsupervised learning. Under unsupervised learning, the algorithm 316 learns patterns from unlabeled training data as described herein.

The model layer 306 implements the AI model using data from the data layer and the algorithm 316 and ML framework 314 from the structure layer 304, thus enabling decision-making capabilities of the AI system 300. The model layer 306 can include a model structure 320, model parameters 322, a loss function engine 324, an optimizer 326, and/or a regularization engine 328.

The model structure 320 describes the architecture of the AI models of the AI system 300, such as the models executed by the preprocessor 110, region encoder 120, data augmenter 130, instance encoder 140, and/or decoder 150. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, Generative Adversarial Networks (GANs), and Transformers.

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function. To that end, the loss function engine 324 can generate various loss function metrics described herein.

The optimizer 326 adjusts the model parameters 322 to minimize the loss function during training of the algorithm 316. In other words, the optimizer 326 uses the loss function/metrics generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the data layer 302.

The regularization engine 328 executes s regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problems or perform tasks. In an example implementation, the application layer 308 can include the publisher 160, application 172, and/or source computing system 102 of FIG. 1A. The application layer 308 can include various user interfaces, such as graphical user interfaces, chat bots, and prompt inputs, prompt generators, and so forth.

Figure 3B:
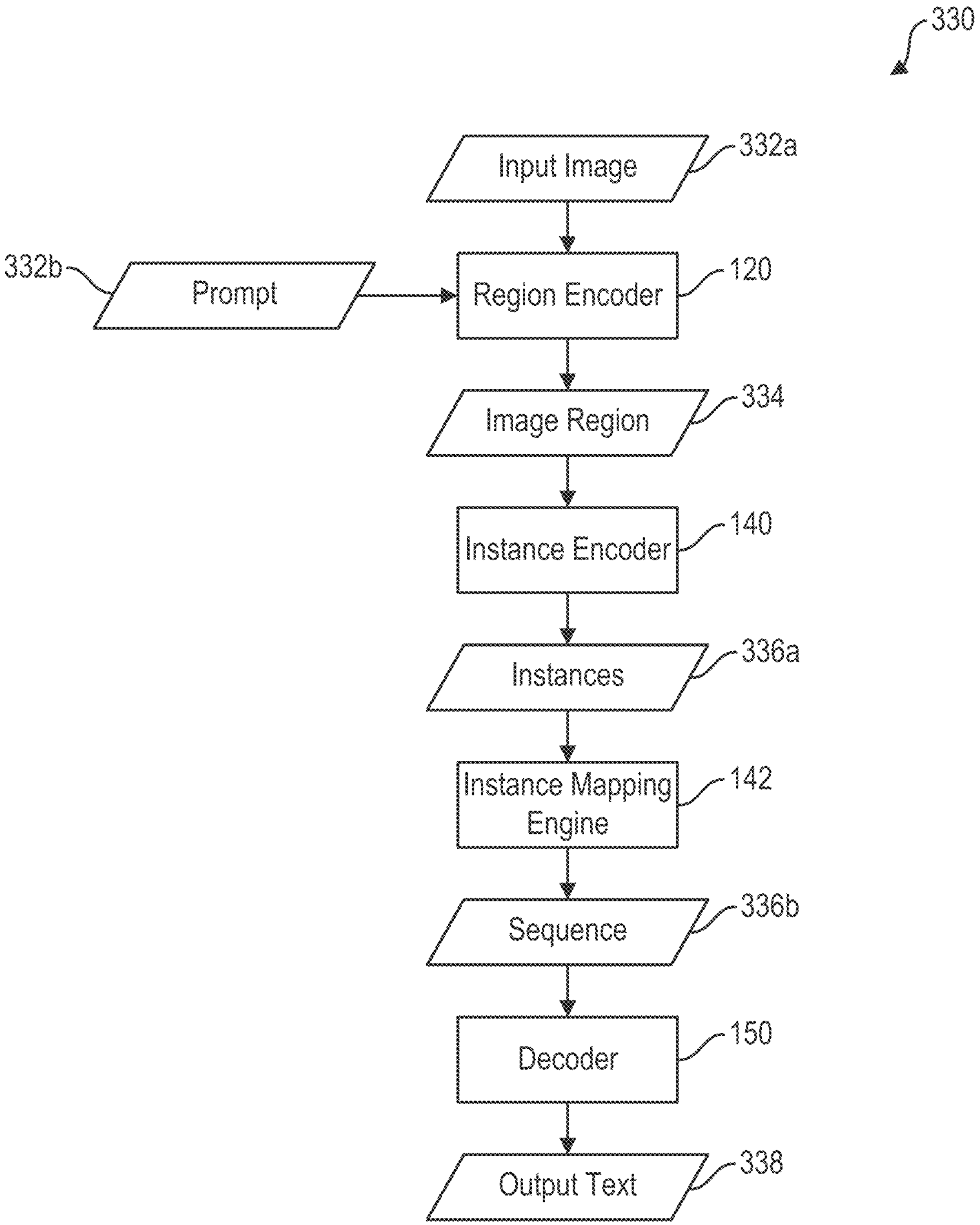
FIG. 3B illustrates a flow for generating output text from input images through the text recognition platform of FIG. 1A, in accordance with some implementations of the present technology.

FIG. 3B illustrates a flow 330 for generating output text from input images through the text recognition platform 106 of FIG. 1A, in accordance with some implementations of the present technology.

For example, the flow 330 enables text recognition platform 106 to obtain an input image 332*a* associated with a document. The input image 332*a* can include an image of a page of a document, such as a page of a medical record or a side of a check. The input image 332*a* can include information written in text, including handwriting, printed text, or other modalities of alphanumeric characters. In some implementations, the input image 332*a* can include computer-readable text (e.g., magnetic ink character recognition characters).

The flow 330 enables the text recognition platform 106 to receive a prompt 332*b* from or via a user interface. For example, the text recognition platform 106 can receive a prompt for information relating to the input image 332*a*. The prompt can include a question or a query associated with information within a portion of the input image 332*a*. For example, the prompt can request information relating to a check number or an amount associated with the check. Additionally or alternatively, the prompt can request information relating to a vaccination date or another date associated with a patient's medical record. The text recognition platform 106 enables retrieval of text in response to these prompts based on intelligent determination of regions of interest that are likely relevant to the prompt, using techniques such as self-recursion and/or global contextual attention.

The flow 330 enables the text recognition platform 106 to accept the input image 332*a* and/or the prompt 332*b* at the region encoder 120 (e.g., the region encoder 120 as shown in FIG. 1A). The region encoder 120 enables the text recognition platform 106 to generate an image region 334 of interest, where the image region 334 is determined to be relevant to the prompt 332*b* in light of the input image 332*a*. As an illustrative example, the region encoder 120 can generate a set of coordinates associated with a bounding box, where the bounding box includes a portion of the input image 332*a* with information responsive to the prompt 332*b*. For example, the region encoder 120 can localize a region of the input image with the amount of the check (e.g., the amount line or the amount box) or can determine the location of a field associated with a particular vaccination (e.g., a field associated with the associated vaccination date 184). As discussed above in relation to FIG. 1A, the region encoder 120 can be trained in a supervised, global context-aware manner (e.g., utilizing attention-based knowledge distillation), thereby improving the accuracy of the encoder, while encoding and retaining model parameters associated with historical training.

The flow 330 enables the text recognition platform 106 to generate instances 336*a* through a self-supervised instance encoder 140 (e.g., the instance encoder 140 as shown in FIG. 1A). For example, the flow 330 enables the text recognition platform 106 to generate instances, which may include examples of features of the image region that correspond to classifications of the instance encoder 140. For example, the text recognition platform 106, through the instance encoder 140, can generate projections of features within the image region 334 within an encoding space. In some implementations such projections are generated in a character-level attention-based manner, thereby improving the resilience of the encoder to differences in modalities (e.g., types of text that are detected). In some implementations, the text recognition platform 106 can be trained in a self-supervised manner, through the self-supervised training engine 144, thereby improving the accuracy of the instance encoder 140. In some implementations, further training can occur by generating augmentations of the image region and providing these augmentations to the instance encoder 140 to generate information to be used in a self-supervised contrastive loss algorithm (e.g., the self-supervised contrastive loss engine 148), thereby further improving the accuracy of the instance encoder 140 in a dynamic manner.

The flow 330 enables the text recognition platform 106 to generate sequences 346 from the instances 336*a* (e.g., utilizing an instance mapping engine 142, which can be analogous to the instance mapping engine 142). For example, the text recognition platform 106 can organize or structure the instances 336*a* into a data structure that encodes an order of the instances (e.g., an order of the associated characters of the text to be recognized within the image region 334). By doing so, the text recognition platform 106 enables sequence-aware recognition of text, thereby improving the ability to capture and utilize relationships between instances in the associated text recognition.

The flow 330 enables the text recognition platform 106 to decode the sequence 336*b* utilizing the decoder 150 to generate the output text 338. For example, the text recognition platform 106 can generate an output text string by applying a transformer 152, a CTC decoder 154, or an attention decoder 156 to the sequence 336*b*. Based on doing so, the decoder can generate an output where characters within the image region 334 are recognized and included in output text. As an illustrative example, the output text 338 can include a date (e.g., with alphanumeric characters and/or other special characters, such as slashes or other punctuation characters) associated with a vaccination. Additionally or alternatively, the output text 338 can include numbers, letters, words, sentences, or other natural language tokens associated with the input image and/or the region within. As such, the flow 330 enables generation of output text based on input prompts and input images, in a prompt-aware, context-aware manner.

Figure 3C:
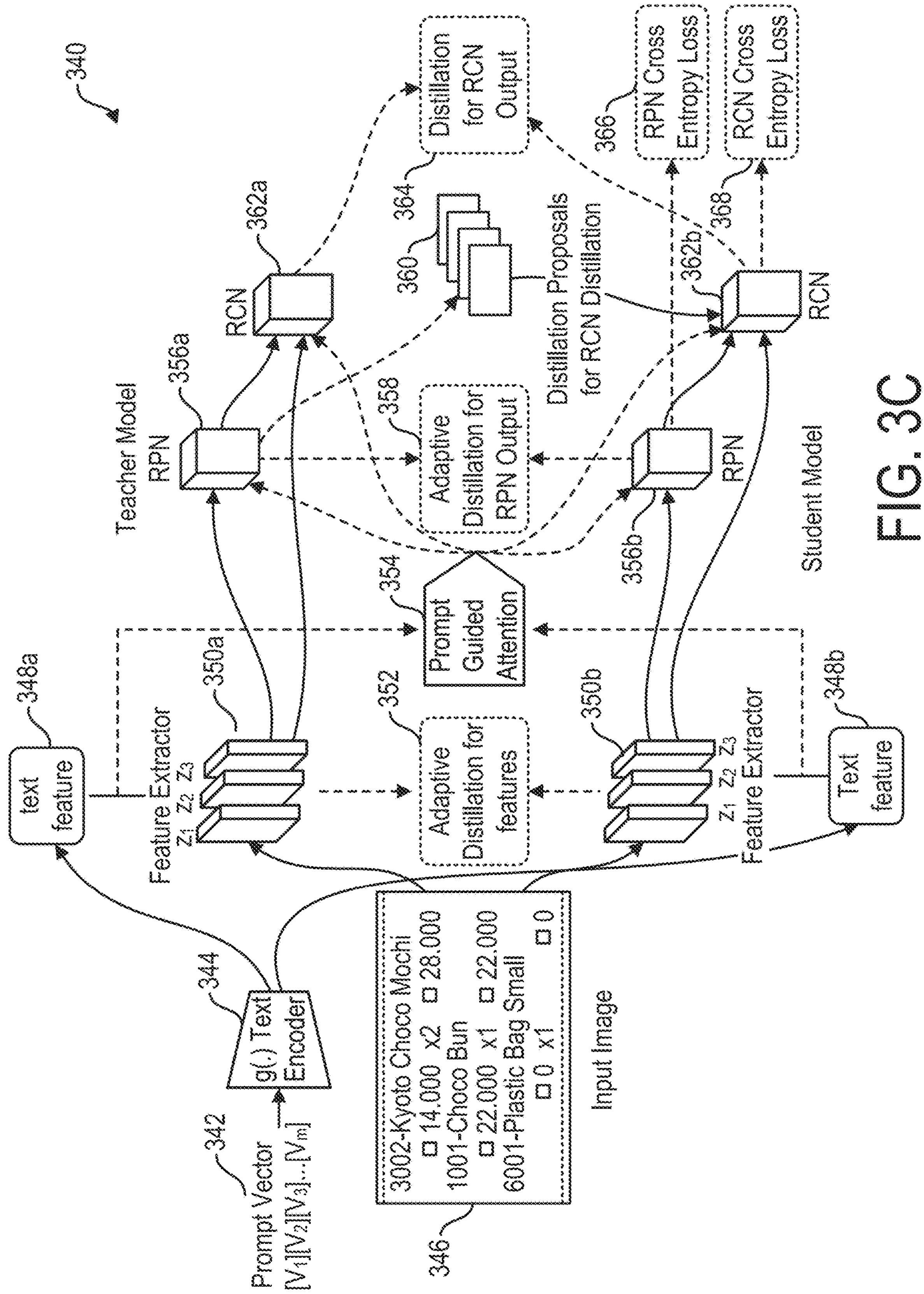
FIG. 3C illustrates a framework for training a region encoder using a continual knowledge distillation engine, in accordance with some implementations of the present technology.

FIG. 3C illustrates a framework 340 for training a region encoder using a continual knowledge distillation engine, in accordance with some implementations of the present technology. For example, the framework 340 enables the region encoder 120 to obtain a prompt vector 342 (e.g., as generated through the vectorization engine 112) and encode the text utilizing a text encoder 344. Using the text encoder 344, the region encoder 120 can generate text feature 348*a* associated with a first feature extractor 350*a* and/or a text feature 348*b* associated with a second feature extractor 350*b*.

For example, the region encoder 120 can accept the input image 346 and extract features from the input image 346 in a prompt-dependent manner through the feature extractor 350*a* and the feature extractor 350*b*, where the feature extractors can be trained in a prompt-dependent manner (e.g., with prompts and/or vector representations of such prompts or associated text features as inputs). For example, the first feature extractor 350*a* and the second feature extractor 350*b* can include or be a teacher model and a student model respectively, whereby the region encoder 120 can utilize adaptive distillation for training at operations 352.

For example, a feature extractor can include a neural network or another algorithm configured to extract features from images. As an illustrative example, the feature extractor can include extraction of features (e.g., geometric or other features within the image). For example, feature extraction techniques can include convolutional neural networks (RCNN), Single Shot Detectors (SSD), or other suitable algorithms. As such, the feature extractor can include a student-teacher architecture as described in relation to FIG. 1A, where the feature extractor 350*a* can include more complex model parameters or associated characteristics than those associated with the feature extractor 350*b*. Additionally or alternatively, the feature extractor 350*a* can include layers or parameters associated with prior knowledge (e.g., associated with training routines carried out earlier), while the feature extractor 350*b* can be associated with shallower, newer knowledge.

In some implementations, the region encoder 120 can generate prompt-guided attention utilizing the text features 348*a* and/or 348*b*. The region encoder 120 can transmit the features extracted at the feature extractors 350*a* and 350*b* to respective models. For example, the region encoder 120 can transmit features from the feature extractor 350*a* to a teacher model associated with the teacher block 124. The region encoder 120 can transmit features from the feature extractor 350*b* to a student model associated with the student block 126. The region encoder 120 can transmit text features 348*a* and/or 348*b* to the teacher model and the student model.

The teacher model can include a region proposal network (RPN) 356*a* and/or a regression and classification network (RCN) 362*a*. The student model can include a region proposal network 356*b* and/or a bounding-box RCN 362*b*. For example, a region proposal network 356*a* or 356*b* can include a convolutional neural network that predicts object bounds and objectness scores (scores that measure how well various locations and classes of objects, such as characters and sequences, are identified at various positions within an image). For example, the region proposal network can propose regions of an input image (e.g., the input image 346) that are likely associated with elements or features within the prompt vector 342. For example, such regions can include indications of candidate boxes (e.g., with associated characteristics, such as scales, aspect ratios, positions, coordinates, and/or sizes). For example, the teacher model RPN 356*a* can generate a set of distillation proposals for RCN distillation. RCN 362*a* or 362*b* can include a model or a technique to refine or predict localization boxes in object detection or text detection. For example, the RCN 362*a* or 362*b* can utilize distillation proposals 360 to generate predictions for bounding boxes associated with text features 348*a* and 348*b* and/or queries associated with the prompt vector 342.

For example, the region encoder 120 can transmit the output of the teacher model RPN 356*a* to the teacher model RCN 362*a* for knowledge distillation for the RCN output at the operations 364. Similarly, the region encoder 120 can transmit the output of the student model RPN 356*b* to the student model RCN 362*b* for knowledge distillation for the RCN output at the operations 364. Additionally or alternatively, at operations 358 the region encoder 120 can perform adaptive distillation for the RPN output utilizing outputs or model parameters from the teacher model RPN 356*a* and/or the student model RPN 356*b*. Based on the outputs of the student model RPN 356*a* and the teacher model RPN 356*b*, the region encoder 120 can generate an RPN cross-entropy loss metric 366. Based on the outputs of the student model RCN 362*a* and the teacher model RPN 362*b*, the region encoder 120 can generate an RCN cross entropy loss metric 368, thereby enabling further continual training of the region encoder 120. For example, the knowledge distillation at operations 352, 358, and/or 364 can be carried out in a prompt-dependent manner, with prompt-guided attention 354, thereby improving the quality of bounding box determination through the region encoder 120. The cross-entropy can include a measure of difference between various probability distributions. For example, a cross-entropy loss function (e.g., the RPN cross-entropy loss metric 366 or RCN cross-entropy loss metric 368) enables detection and classification of a bounding box as being associated with an object and/or background. For example, a resulting indication of cross-entropy loss can include an indication of whether a particular bounding box (e.g., one of the distillation proposals 360 generated at the teacher model RPN 356*a*) is associated with an object that is relevant to the prompt vector 342 or is not associated with such an object based on a comparison of respective probability distributions.

Figure 3D:
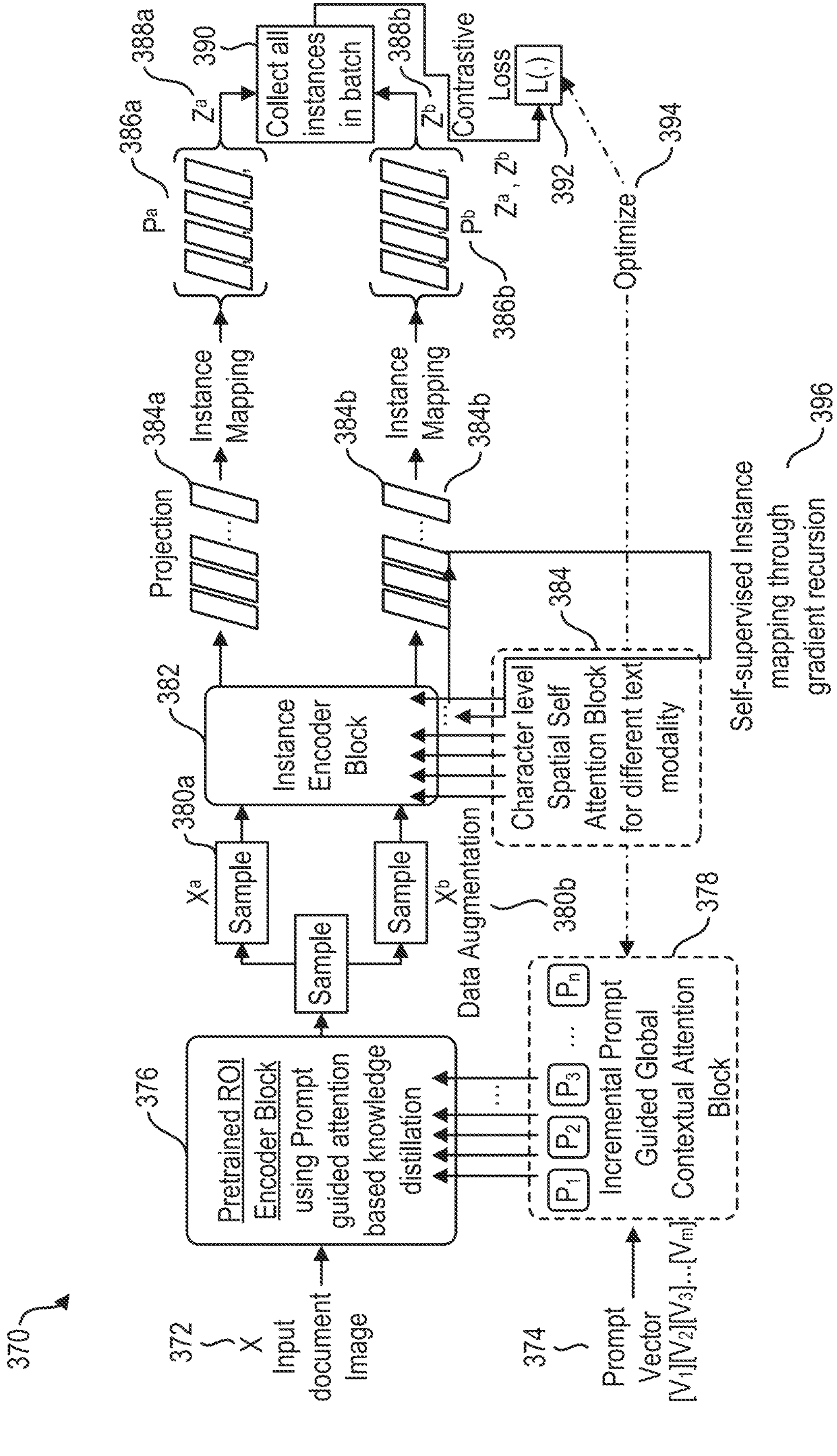
FIG. 3D illustrates a framework for training the text recognition platform of FIG. 1A, in accordance with some implementations of the present technology.

FIG. 3D illustrates a framework 370 for training the text recognition platform 106 of FIG. 1A, in accordance with some implementations of the present technology. For example, the text recognition platform 106 can obtain the input document image 372 (e.g., the input image 332*a* of FIG. 3B) and utilize a pretrained region-of-interest encoder block 376 (e.g., the region encoder 120 of FIG. 1A), along with an incremental prompt-guided global contextual attention block 378 (e.g., the global contextual attention engine 128 of FIG. 1A) configured to analyze the prompt vector 374 (e.g., associated with the prompt 332*b* of FIG. 3B). Based on the incremental prompt-guided global contextual attention block 378 and the pretrained region-of-interest encoder block 376, the region encoder 120 can generate an image 380*a* associated with a region of the input document image 372.

The text recognition platform 106 can perform data augmentation operations on the image associated with the region to generate augmentation entity 380*b*, for example, utilizing the data augmenter 130 of FIG. 1A. The text recognition platform 106 can provide the image 380*a* and the augmentation 380*b* to the instance encoder block 382 (e.g., the instance encoder 140 of FIG. 1A) to generate a first set of instances 384*a* associated with the image 380*a* and a second set of instances 384*b* associated with the augmentation 380*b*. In some implementations, the instance encoder 140 can generate the instances in a character-specific manner, through utilization of the character-level spatial self-attention block 384 for different text modalities (e.g., through the character-level attention engine 146).

Utilizing the instance mapping engine 142, the text recognition platform 106 can generate associated sequences 386*a* and 386*b*, respectively. For example, the projection of the images into instances and the mapping of the instances to sequences can be a self-supervised process performed using a gradient recursion technique, as discussed in relation to the FIG. 1A. Based on these sequences, the text recognition platform 106 can generate instances 388*a* and 388*b* associated with the sequences 386*a* and 386*b* and collect these within a batch at operations 390. Based on these sequences, the text recognition platform 106, through the self-supervised training engine 144, can generate a self-supervised contrastive loss metric 392, where the self-supervised contrastive loss metric 392 encodes information relating to differences and similarities of sequences and instances within the sequences between the predictions for the augmented data (e.g., the augmentation 380*b*) and the predictions for the un-augmented data (e.g., the image 380*a*). Based on a minimization algorithm associated with the contrastive loss metric 392, the self-supervised training engine 144 can train the instance encoder 140 (e.g., the instance encoder block 382) to improve text recognition by improving classification between features that are relevant to text recognition and features that are not relevant (e.g., by comparing differences between instances associated with the augmentation 380*b* and the image 380*a*).

Example Computing Environment of the Text Recognition Platform

Figure 4:
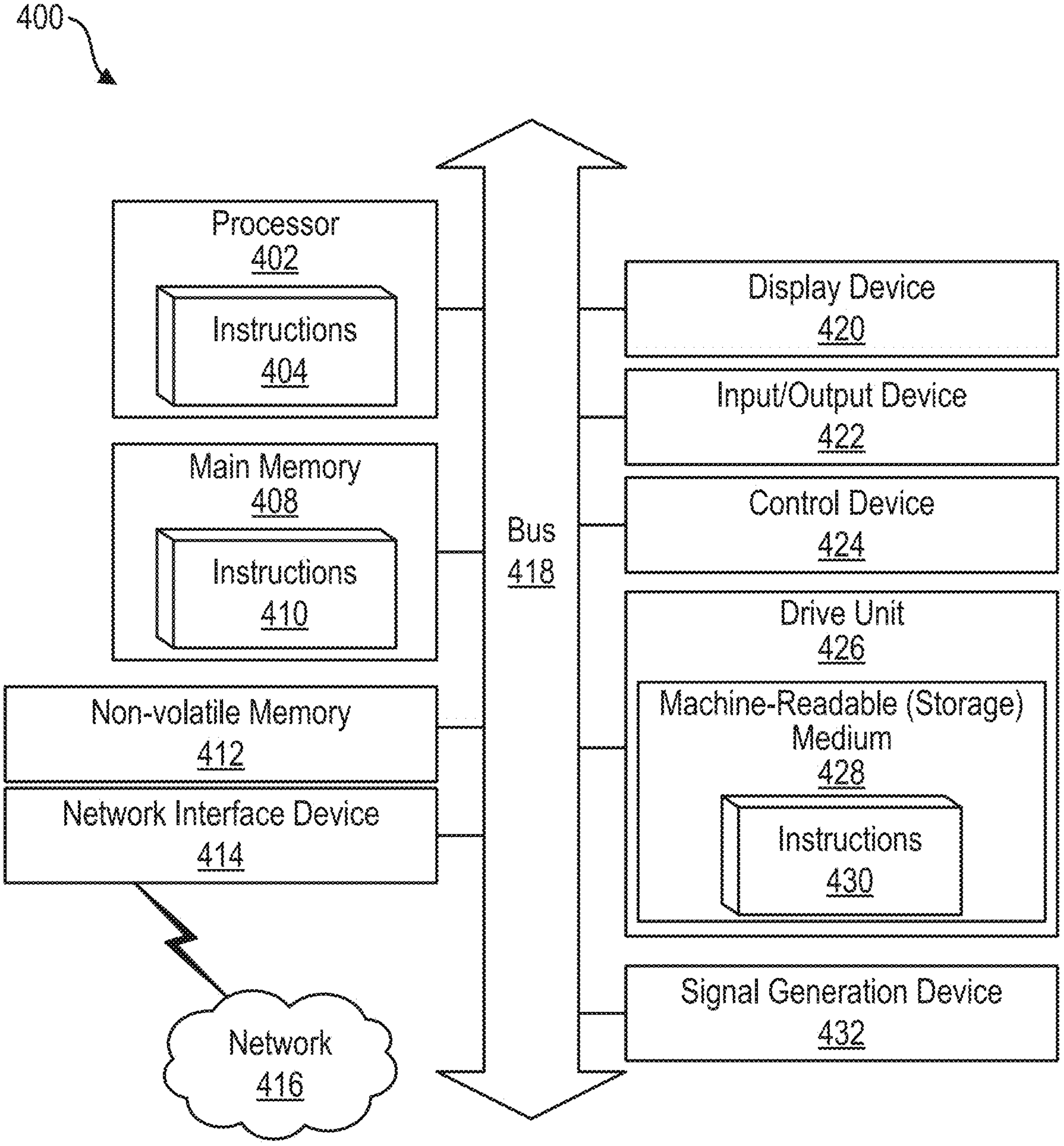
FIG. 4 is a block diagram showing some of the components typically incorporated in at least some of the computer systems and other devices on which the text recognition platform operates in accordance with some implementations of the present technology.

FIG. 4 is a block diagram showing some of the components typically incorporated in at least some of the computer systems and other devices 400 on which the disclosed text recognition platform 106 operates in accordance with some implementations of the present technology. As shown, an example computer system 400 can include: one or more processors 402, main memory 408, non-volatile memory 410, a network interface device 414, video display device 420, an input/output device 422, a control device 424 (e.g., keyboard and pointing device), a drive unit 426 that includes a machine-readable medium 428, and a signal generation device 432 that are communicatively connected to a bus 418. The bus 418 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 414 enables the computer system 400 to exchange data in a network 416 with an entity that is external to the computing system 400 through any communication protocol supported by the computer system 400 and the external entity. Examples of the network interface device 414 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 408, non-volatile memory 412, machine-readable medium 428) can be local, remote, or distributed. Although shown as a single medium, the machine-readable medium 428 can include multiple media (e.g., a centralized/distributed database and/or associated caches and servers) that store one or more sets of instructions 430. The machine-readable (storage) medium 428 can include any medium that is capable of storing, encoding, or carrying a set of instructions for execution by the computer system 400. The machine-readable medium 428 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 410, 430) set at various times in various memory and storage devices in computing device(s). When read and executed by the processor 402, the instruction(s) cause the computer system 400 to perform operations to execute elements involving the various aspects of the disclosure.

Figure 5:
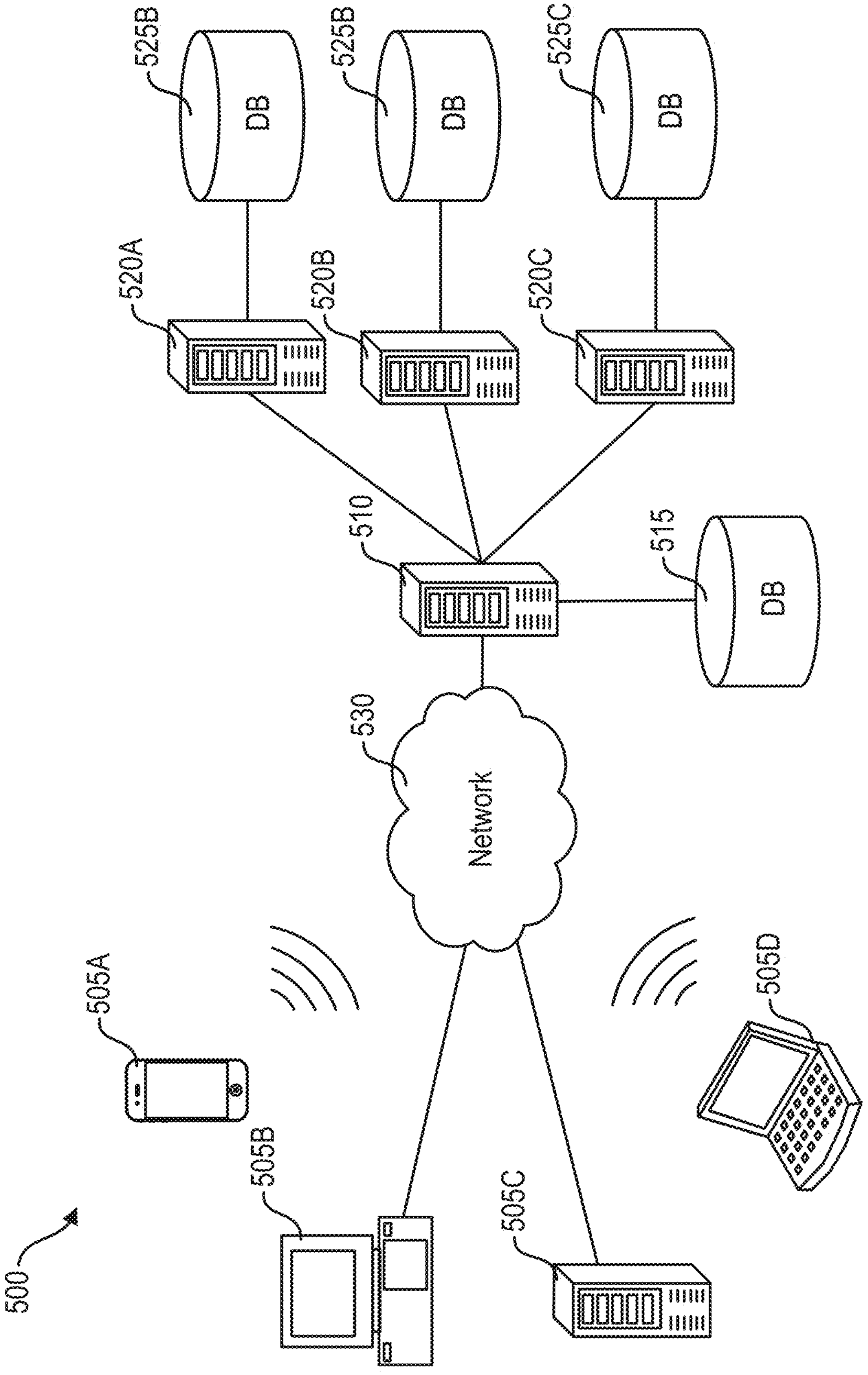
FIG. 5 is a system diagram illustrating an example of a computing environment in which the text recognition platform operates in some implementations of the present technology.

FIG. 5 is a system diagram illustrating an example of a computing environment in which the disclosed text recognition platform 106 operates in some implementations. In some implementations, environment 500 includes one or more client computing devices 505A-D, examples of which can host the text recognition platform 106 of FIG. 1A. Client computing devices 505 operate in a networked environment using logical connections through network 530 to one or more remote computers, such as a server computing device.

In some implementations, server 510 is an edge server which receives client requests and coordinates fulfillment of those requests through other servers, such as servers 520A-C. In some implementations, server computing devices 510 and 520 comprise computing systems, such as the text recognition platform 106 of FIG. 1A. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server or client devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse (e.g., store) information such as input images, sequences, maps, training data, weights, scores, metrics and their associated values, thresholds, and so forth. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. Client computing devices 505 are connected to network 530 through a network interface, such as by wired or wireless communication. While the connections between server 510 and servers 520 are shown as separate connections, these connections can be any kind of local, wide area, wired, or wireless network, including network 530 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. At least one non-transitory, computer-readable storage medium comprising instructions recorded thereon, the instructions, when executed by at least one processor of a text recognition system, causing the text recognition system to:
- using an image file that includes a visual representation of alphanumeric characters, cause a trained region encoder to determine a region of interest in the image file;
- generate a data augmentation entity that comprises a modified image associated with an image extracted from the region of interest;
- using a trained instance encoder, generate a first set of visual instances corresponding to the image and a second set of visual instances corresponding to the data augmentation entity;
- generate a first sequence associated with the first set of visual instances and a second sequence associated with the second set of visual instances; and
- based on a comparison of the first sequence and the second sequence, perform operations comprising:
  - generate additional training data for the trained region encoder; and
  - cause an instance decoder to generate an indication of recognized alphanumeric data that corresponds to the region of interest.

2. The at least one non-transitory, computer-readable storage medium of claim 1, wherein the instructions to further train the trained region encoder cause the text recognition system to:
- provide a representation of a prompt and the image file to a first feature extractor to generate a first feature set associated with a teacher model;
- provide the representation of the prompt and the image file to a second feature extractor to generate a second feature set associated with a student model;
- based on providing the first feature set and the prompt to the teacher model, generate a set of region proposals;
- using the second feature set, the prompt, and the set of region proposals provided to the student model, generate a cross-entropy loss metric; and
- update the student model based on the cross-entropy loss metric to train the trained region encoder.

3. The at least one non-transitory, computer-readable storage medium of claim 1, wherein the instructions for generating the region of interest cause the text recognition system to:
- generate a prompt vector representing the prompt in a vector format;
- provide the prompt vector to a global contextual attention engine to generate a set of attention indicators associated with elements of the prompt vector, the set of attention indicators comprising a set of attention weights; and
- determine the region of interest using the set of attention indicators and the prompt vector.

4. The at least one non-transitory, computer-readable storage medium of claim 3, further comprising operations to, based on providing first image and an output to the global contextual attention engine, update the global contextual attention engine to generate a set of updated region determinations based on input prompts.

5. The at least one non-transitory, computer-readable storage medium of claim 1, wherein the instructions for generating the data augmentation entity cause the text recognition system to perform a first operation on the image to generate the modified image, wherein the first operation comprises at least one of: a rotation, a translation, a scaling, a noise addition, a color variation, a linear contrast operation, a shear operation, or a skew operation.

6. The at least one non-transitory, computer-readable storage medium of claim 1, wherein the instructions cause the text recognition system to:
- using gradient recursion on the first set of visual instances and the second set of visual instances of the trained instance encoder, automatically generate updated model parameters for the trained instance encoder; and
- using the updated model parameters, retrain the trained instance encoder to generate sets of instances.

7. The at least one non-transitory, computer-readable storage medium of claim 1, wherein the instance decoder comprises a transformer model, an attention decoder, or a connectionist temporal classification model.

8. A text recognition system comprising at least one processor and at least one non-transitory, computer-readable storage medium comprising instructions recorded thereon, the instructions, when executed by the at least one, causing the text recognition system to:
- using an image file that includes a visual representation of alphanumeric characters, cause a trained region encoder to determine a region of interest in the image file;
- generate a data augmentation entity that comprises a modified image associated with an image extracted from the region of interest;
- using a trained instance encoder, generate a first set of visual instances corresponding to the image and a second set of visual instances corresponding to the data augmentation entity;
- generate a first sequence associated with the first set of visual instances and a second sequence associated with the second set of visual instances; and
- based on a comparison of the first sequence and the second sequence, perform operations comprising:
  - generate additional training data for the trained region encoder; and
  - cause an instance decoder to generate an indication of recognized alphanumeric data that corresponds to the region of interest.

9. The text recognition system of claim 8, wherein the instructions to further train the trained region encoder cause the text recognition system to:
- provide a representation of a prompt and the image file to a first feature extractor to generate a first feature set associated with a teacher model;
- provide the representation of the prompt and the image file to a second feature extractor to generate a second feature set associated with a student model;
- based on providing the first feature set and the prompt to the teacher model, generate a set of region proposals;
- using the second feature set, the prompt, and the set of region proposals provided to the student model, generate a cross-entropy loss metric; and
- update the student model based on the cross-entropy loss metric to train the trained region encoder.

10. The text recognition system of claim 8, wherein the instructions for generating the region of interest cause the text recognition system to:
- generate a prompt vector representing the prompt in a vector format;
- provide the prompt vector to a global contextual attention engine to generate a set of attention indicators associated with elements of the prompt vector, the set of attention indicators comprising a set of attention weights; and determine the region of interest using the set of attention indicators and the prompt vector.

11. The text recognition system of claim 10, the instructions further causing operations to, based on providing first image and an output to the global contextual attention engine, update the global contextual attention engine to generate a set of updated region determinations based on input prompts.

12. The text recognition system of claim 8, wherein the instructions for generating the data augmentation entity cause the text recognition system to perform a first operation on the image to generate the modified image, wherein the first operation comprises at least one of: a rotation, a translation, a scaling, a noise addition, a color variation, a linear contrast operation, a shear operation, or a skew operation.

13. The text recognition system of claim 8, wherein the instructions cause the text recognition system to:

using gradient recursion on the first set of visual instances and the second set of visual instances of the trained instance encoder, automatically generate updated model parameters for the trained instance encoder; and using the updated model parameters, retrain the trained instance encoder to generate sets of instances.

14. The text recognition system of claim 8, wherein the instance decoder comprises a transformer model, an attention decoder, or a connectionist temporal classification model.

15. A computer-implemented method, comprising:

using an image file that includes a visual representation of alphanumeric characters, causing a trained region encoder of a text recognition system to determine a region of interest in the image file;

generating a data augmentation entity that comprises a modified image associated with an image extracted from the region of interest;

using a trained instance encoder, generating a first set of visual instances corresponding to the image and a second set of visual instances corresponding to the data augmentation entity;

generating a first sequence associated with the first set of visual instances and a second sequence associated with the second set of visual instances; and based on a comparison of the first sequence and the second sequence, performing operations comprising:

generating additional training data for the trained region encoder; and causing an instance decoder to generate an indication of recognized alphanumeric data that corresponds to the region of interest.

16. The method of claim 15, further comprising:

providing a representation of a prompt and the image file to a first feature extractor to generate a first feature set associated with a teacher model;

providing the representation of the prompt and the image file to a second feature extractor to generate a second feature set associated with a student model;

based on providing the first feature set and the prompt to the teacher model, generating a set of region proposals;

using the second feature set, the prompt, and the set of region proposals provided to the student model, generating a cross-entropy loss metric; and updating the student model based on the cross-entropy loss metric to train the trained region encoder.

17. The method of claim 15, further comprising:

generating a prompt vector representing the prompt in a vector format;

providing the prompt vector to a global contextual attention engine to generate a set of attention indicators associated with elements of the prompt vector, the set of attention indicators comprising a set of attention weights; and determining the region of interest using the set of attention indicators and the prompt vector.

18. The method of claim 17, further comprising, based on providing first image and an output to the global contextual attention engine, updating the global contextual attention engine to generate a set of updated region determinations based on input prompts.

19. The method of claim 15, further comprising causing the text recognition system to perform a first operation on the image to generate the modified image, wherein the first operation comprises at least one of: a rotation, a translation, a scaling, a noise addition, a color variation, a linear contrast operation, a shear operation, or a skew operation.

20. The method of claim 15, further comprising:

using gradient recursion on the first set of visual instances and the second set of visual instances of the trained instance encoder, automatically generating updated model parameters for the trained instance encoder; and using the updated model parameters, retraining the trained instance encoder to generate sets of instances.

* * * * *